(12) United States Patent
Biegelsen

(10) Patent No.: US 12,017,272 B2
(45) Date of Patent: Jun. 25, 2024

(54) PRINTER JETTING MECHANISM AND PRINTER EMPLOYING THE PRINTER JETTING MECHANISM

(71) Applicant: XEROX CORPORATION, Norwalk, CT (US)

(72) Inventor: David K. Biegelsen, Portola Valley, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/449,019

(22) Filed: Sep. 27, 2021

(65) Prior Publication Data

US 2023/0102980 A1   Mar. 30, 2023

(51) Int. Cl.
*B22D 23/00* (2006.01)
*B22F 12/10* (2021.01)
(Continued)

(52) U.S. Cl.
CPC ............ *B22D 23/003* (2013.01); *B22F 12/10* (2021.01); *B22F 12/53* (2021.01); *B33Y 30/00* (2014.12)

(58) Field of Classification Search
CPC .... B22D 27/02; B22D 11/106; B22D 11/103; B22D 11/10; B22D 23/003; B33Y 30/00
See application file for complete search history.

(56) References Cited

U.S. PATENT DOCUMENTS

| | | |
|---|---|---|
| 4,925,103 A | 5/1990 | Muench et al. |
| 5,245,244 A | 9/1993 | Takahashi et al. |

(Continued)

FOREIGN PATENT DOCUMENTS

| | | |
|---|---|---|
| WO | 2007/038987 A1 | 4/2007 |
| WO | 2013/050250 A1 | 4/2013 |
| WO | 2017/089176 A1 | 6/2017 |

OTHER PUBLICATIONS

Biegelsen, D.K., "Printer Jetting Mechanism and Printer Employing the Printer Jetting Mechanism," U.S. Appl. No. 17/448,981, filed Sep. 27, 2021.

(Continued)

*Primary Examiner* — Anthony M Liang
*Assistant Examiner* — Ricardo D Morales
(74) *Attorney, Agent, or Firm* — MH2 Technology Law Group LLP

(57) ABSTRACT

A three-dimensional ("3D") printer. The 3D printer includes: a plurality of ejector conduits arranged in an array, each ejector conduit comprising a first end positioned to accept a print material, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway; a current pulse generating system in electrical contact with the ejector nozzle of each of the plurality of ejector conduits; a magnetic field source sufficiently proximate the second end of the ejector conduit so as to generate a flux region disposed within the ejector nozzle during operation of the 3D printer; and a positioning system for controlling the relative position of the array with respect to a print substrate in a manner that would allow the print substrate to receive print material jettable from the ejector nozzle of each of the plurality of ejector conduits during operation of the 3D printer.

21 Claims, 15 Drawing Sheets

(51) Int. Cl.
*B22F 12/53* (2021.01)
*B33Y 30/00* (2015.01)

(56) References Cited

U.S. PATENT DOCUMENTS

| | | | |
|---|---|---|---|
| 5,261,611 | A | 11/1993 | Huxford |
| 5,276,419 | A | 1/1994 | Griffin et al. |
| 5,377,961 | A | 1/1995 | Smith et al. |
| 5,649,992 | A | 7/1997 | Carter, Jr. et al. |
| 5,779,971 | A | 7/1998 | Tsung Pan et al. |
| 6,202,734 | B1 | 3/2001 | Sackinger et al. |
| 6,378,743 | B1 | 4/2002 | Kagan |
| 8,444,028 | B2 | 5/2013 | Rasa et al. |
| 8,721,032 | B2 | 5/2014 | Kuznetsov et al. |
| 9,168,549 | B2 | 10/2015 | Slot |
| 9,198,299 | B2 | 11/2015 | Ulmer et al. |
| 9,616,494 | B2 | 4/2017 | Vader et al. |
| 10,052,689 | B2 | 8/2018 | Rasa |
| 10,195,665 | B2 | 2/2019 | Sachs et al. |
| 10,543,532 | B2 | 1/2020 | Sachs et al. |
| 10,974,320 | B2 | 4/2021 | Pan et al. |
| 11,241,833 | B2 | 2/2022 | Gandhiraman et al. |
| 2004/0217186 | A1 | 11/2004 | Sachs et al. |
| 2007/0097180 | A1 | 5/2007 | Carlson et al. |
| 2011/0233239 | A1 | 9/2011 | Rasa et al. |
| 2011/0285792 | A1 | 11/2011 | Byun et al. |
| 2014/0217134 | A1 | 8/2014 | Rasa |
| 2014/0322451 | A1 | 10/2014 | Barton et al. |
| 2015/0273577 | A1 | 10/2015 | Vader et al. |
| 2015/0336170 | A1* | 11/2015 | Wagstaff ............... B22D 21/04 222/592 |
| 2016/0082654 | A1 | 3/2016 | Jakkaku |
| 2016/0107441 | A1 | 4/2016 | Joppen et al. |
| 2016/0236411 | A1 | 8/2016 | Ohnishi |
| 2016/0256888 | A1 | 9/2016 | Rasa et al. |
| 2016/0346998 | A1 | 12/2016 | Mark et al. |
| 2016/0361763 | A1 | 12/2016 | Batchelder et al. |
| 2017/0028467 | A1* | 2/2017 | Rasa .................. B22D 45/005 |
| 2017/0056966 | A1 | 3/2017 | Myerberg et al. |
| 2017/0087632 | A1* | 3/2017 | Mark .................. B22D 27/003 |
| 2017/0252829 | A1 | 9/2017 | Sachs |
| 2017/0355138 | A1 | 12/2017 | Mark |
| 2018/0141119 | A1 | 5/2018 | Shu et al. |
| 2019/0061349 | A1 | 2/2019 | Kanaris et al. |
| 2019/0143449 | A1 | 5/2019 | Zenou |
| 2019/0375003 | A1 | 12/2019 | Mark |
| 2020/0258717 | A1 | 8/2020 | Gandhiraman et al. |
| 2020/0324486 | A1 | 10/2020 | Mantell et al. |
| 2020/0346281 | A1 | 11/2020 | Hosek |
| 2021/0070043 | A1 | 3/2021 | Tse et al. |
| 2021/0162493 | A1 | 6/2021 | Herrmann et al. |
| 2021/0245438 | A1 | 8/2021 | Xiao |
| 2021/0323053 | A1 | 10/2021 | Gibson et al. |
| 2022/0062983 | A1 | 3/2022 | Schmitt et al. |
| 2022/0168817 | A1 | 6/2022 | Sambhy et al. |
| 2022/0184948 | A1 | 6/2022 | Wong et al. |
| 2022/0347749 | A1 | 11/2022 | Subramanian |

OTHER PUBLICATIONS

Biegelsen, D.K., "Method of Jetting Print Material and Method of Printing," U.S. Appl. No. 17/448,991, filed Sep. 27, 2021.

Biegelsen, D.K., et al., "Printer Jetting Mechanism and Printer Employing the Printer Jetting Mechanism," U.S. Appl. No. 17/448,997, filed Sep. 27, 2021.

Biegelsen, D.K., et al., "Method of Jetting Print Material and Method of Printing," U.S. Appl. No. 17/449,006, filed Sep. 27, 2021.

Biegelsen, D.K., "Method of Jetting Print Material and Method of Printing," U.S. Appl. No. 17/449,021, filed Sep. 27, 2021.

Biegelsen, D.K., et al., "Printer Jetting Mechanism and Printer Employing the Printer Jetting Mechanism," U.S. Appl. No. 17/449,028, filed Sep. 27, 2021.

Biegelsen, D.K., et al., "Ejector Device, 3D Printer Employing the Ejector Device and Method of 3D Printing," U.S. Appl. No. 17/449,043, filed Sep. 27, 2021.

Biegelsen, D.K., et al., "Method of Jetting Print Material Using Ejector Devices and Methods of Making the Ejector Devices," U.S. Appl. No. 17/449,046, filed Sep. 27, 2021.

Author Unknown, "Chapter 12—Magnetism and Magnetic Circuits," date unknown, 14 pages.

Author Unknown, "MACOR—Machinable Glass Ceramic for Industrial Applications," date unknown, 6 pages.

Rime Faraday Partnership, "An Introduction to MEMS," published in 2002, Wolfson School of Mechanical and anufacturing Engineering Loughborough University, 56 pages.

Ansell, T.Y, "Current Status of Liquid Metal Printing," Journal of Manufacturing and Materials Processing, Apr. 6, 2021, vol. 5, No. 2, 36 pages, https://doi.org/10.3390/jmmp5020031.

* cited by examiner

PRINTER JETTING MECHANISM AND PRINTER EMPLOYING THE PRINTER JETTING MECHANISM

DETAILED DESCRIPTION

Field of the Disclosure

The present disclosure is directed to a printer jetting mechanism and printers used for additive manufacturing, referred to herein as three-dimensional ("3D") printers, that employ the printer jetting mechanism.

Background

Additive manufacturing, also referred to herein as three-dimensional ("3D") printing, is a known manufacturing technique. For example, three-dimensional printers for building 3D objects from molten aluminum and other metals are known in the art.

One such 3D printer is disclosed in U.S. Pat. No. 9,616, 494. The 3D printer works by using DC pulses applied by an electromagnetic coil to expel molten aluminum drops in response. A platen to which the drops are targeted translates to allow for the drops to be connected and built up to produce a three-dimensional object. However, drops of molten aluminum ejected from this 3D printer have diameters of ~0.5 mm or larger. This enables high volume throughput metal part fabrication. However, the relatively large drop size can result in an undesirable degree of porosity of 3D objects printed thereby, as well as uneven build surfaces during fabrication, unwelded drops, and shape inconsistencies. All of these potentially lead to degraded physical properties such as poor tensile strength, as well as poor appearance issues with the final object and/or the inability to print objects with very fine details.

Therefore, methods and systems for improving the quality of three-dimensional objects made from three-dimensional printers, such as, for example, liquid metal printers, would be a step forward in the art.

SUMMARY

An embodiment of the present disclosure is directed to a three-dimensional ("3D") printer. The 3D printer comprises: a plurality of ejector conduits arranged in an array, each ejector conduit comprising a first end positioned to accept a print material, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway; a current pulse generating system in electrical contact with the ejector nozzle of each of the plurality of ejector conduits; a magnetic field source sufficiently proximate the second end of the ejector conduit so as to generate a flux region disposed within the ejector nozzle during operation of the 3D printer; and a positioning system for controlling the relative position of the array with respect to a print substrate in a manner that would allow the print substrate to receive print material jettable from the ejector nozzle of each of the plurality of ejector conduits during operation of the 3D printer.

Another embodiment of the present disclosure is directed to a printer jetting mechanism. The printer jetting mechanism comprises: a plurality of ejector conduits arranged in an array, each ejector conduit comprising a first end positioned to accept the print material, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway; a current pulse generating system in electrical contact with the ejector nozzle of each of the plurality of ejector conduits; and a magnetic field source sufficiently proximate the second end of the ejector conduit so as to generate a flux region disposed within the ejector nozzle during operation of the 3D printer.

Still another embodiment of the present disclosure is directed to a three-dimensional ("3D") printer jetting mechanism. The 3D printer jetting mechanism comprises a plurality of ejector conduits arranged in an array, each ejector conduit comprising a first end positioned to accept the print material, a second end comprising an ejector nozzle, and a passageway defined by an inner surface of the ejector conduit for allowing the print material to pass through the ejector conduit from the first end to the second end. The ejector nozzle comprises a first electrode and a second electrode, at least one surface of the first electrode being exposed in the passageway and at least one surface of the second electrode being exposed in the passageway.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
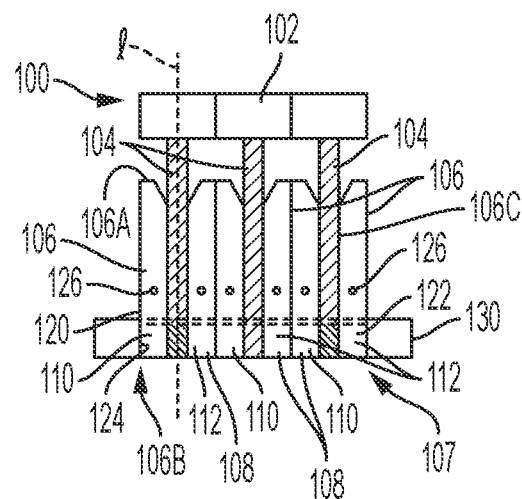
FIG. 1 illustrates a schematic view of a printer jetting mechanism, according to an embodiment of the present disclosure.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration a specific exemplary embodiment in which the present teachings may be practiced. The following description is, therefore, merely exemplary.

The present disclosure is directed to a printer jetting mechanism comprising a plurality of ejector conduits arranged in a jet array, as well as 3D printers employing the printer jetting mechanism. Methods of employing such jetting mechanisms for jetting a print material are also disclosed. The printer jetting mechanism is designed to employ an electrical current and a magnetic field to provide the force for jetting the print material, as will be described in greater detail herein. The jetting mechanisms and methods of printing disclosed herein can provide one or more of the following advantages: the ability to selectively jet a wide range of metals and other materials; the ability to jet selectable droplet volumes; the ability to jet small droplet sizes that enable printing of fine and/or selectable feature sizes; and the ability to print at relatively high throughputs.

Printer Jetting Mechanism

Figure 2:
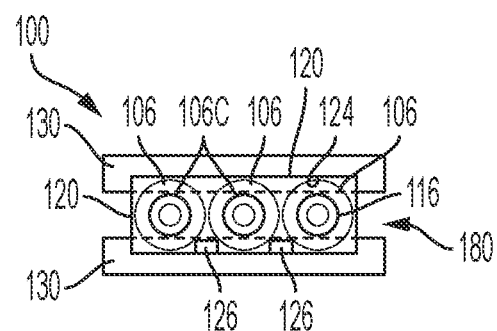
FIG. 2 illustrates a top, schematic view of an array of ejector conduits for the printer jetting mechanism, according to an example of the present disclosure.

FIG. 1 illustrates an example of a printer jetting mechanism 100, according to an embodiment of the present disclosure. The printer jetting mechanism 100 comprises a feeder mechanism 102 for advancing a print material 104 to be printed. Exemplary printing materials 104 are pre-formed wires of selected alloys, molten metals or other materials as will be discussed in greater detail below. A plurality of ejector conduits 106 are arranged in an array 107. Each ejector conduit 106 comprises a first end 106A positioned to accept the print material 104 from the feeder mechanism 102. A second end 106B comprises an ejector nozzle 108. FIG. 2 illustrates a top view of the printer jetting mechanism 100. A passageway 106C defined by an inner surface of each of the ejector conduits 106 allows the print material 104 to pass through the ejector conduits 106 from the first end 106A to the second end 106B.

Figure 4:
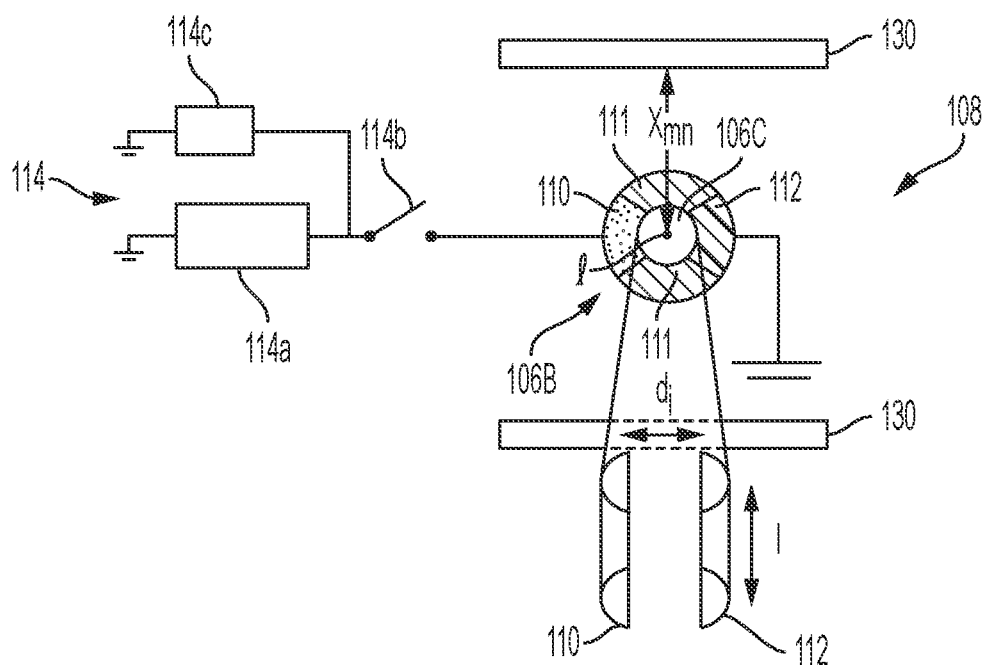
FIG. 4 illustrates a bottom view of an ejector nozzle comprising an electrode pair. A current pulse generating system is illustrated in electrical contact with the electrode pair, according to an embodiment of the present disclosure.

The ejector nozzles 108 comprise at least one pair of electrodes, including a first electrode 110 and a second electrode 112, that are used to supply electrical current to the print material 104. At least one surface of the first electrode 110 is exposed in the passageway 106C and at least one surface of the second electrode 112 is exposed in the passageway 106C. A current pulse generating system 114, shown in FIG. 4, is in electrical contact with the at least one electrode pair of the ejector nozzle 108 of each of the plurality of ejector conduits 106. The current pulse generating system 114 is capable of causing a pulse of current to flow predominantly between the first electrode 110 and the second electrode 112 when an electrically conductive print material 104 is positioned in the ejector nozzle 108.

Figure 3:
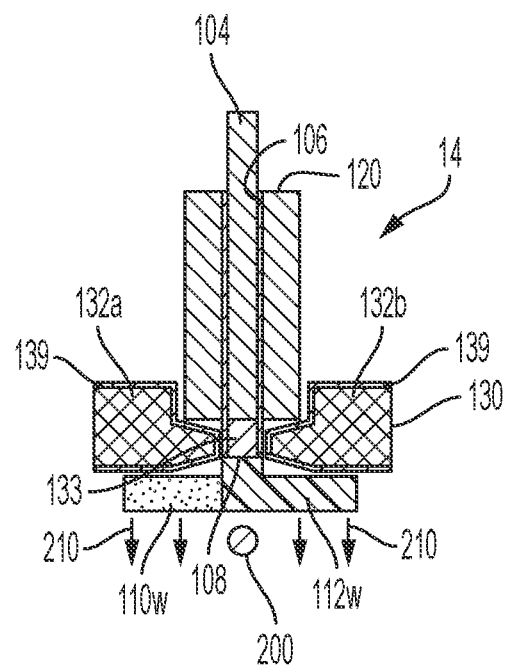
FIG. 3 illustrates a schematic side view of a printer jetting mechanism, according to an embodiment of the present disclosure.

As shown in FIGS. 1 and 3, a magnetic field source 130 is proximate the second end, or ejector nozzle 108, of the plurality of ejector conduits 106. The positioning of the magnetic field source 130 proximate the ejector nozzle can provide for a flux region 133 inside the ejector nozzle 108 and thereby allow for certain advantages over positioning the flux region further upstream. For example, an advantage is that the Lorentz force acts on a reduced mass (e.g., effectively just the mass of print material 104 within the current pulse carrying region between electrodes 110, 112 and the ejector nozzle 108 exit), thereby allowing for a higher peak ejection velocity of print material 104 for a given current. On the other hand, if the Lorentz force generating magnetic field source 130 and electrodes 110, 112 were placed farther upstream in the ejector conduit 106, the same current pulse would accelerate a longer column of print material 104 to a lower peak velocity. For purposes of the present disclosure, the term "flux region" or "magnetic flux region" is any region within the passageways of the ejector conduits 106 that has a magnetic flux density that is greater due to the proximity of the magnetic field source 130, then if the magnetic field source 130 were not present, where the flux density is measured in air (e.g., empty passageway) at room temperature (22° C.).

The magnetic field source 130 is configured to provide a magnetic field that is substantially perpendicular to the flow of electric current through the conductive print material 104 during operation of the ejector nozzle 108, thereby generating a Lorentz force on the conductive print material 104 in the ejector nozzle 108. The flow path of electric current through print material 104 will be determined by the placement of electrodes 110, 112 in the ejector nozzle 108.

The magnetic field source 130 can comprise any suitable type of magnet 132 that can provide the desired magnetic field, such as a permanent magnet or electromagnet current pulse generating system. FIG. 3 illustrates an example in which magnetic field source 130 can be one or more magnets 132, which can be permanent magnets or other types of magnets (e.g., electromagnets) comprising a north pole 132a and a south pole 132b that are each positioned proximate opposing sides of the ejector conduits 106. The north pole 132a and south pole 132b as shown in FIG. 3 can be from the same magnet or two different magnets. Wiring 110w and wiring 112w represent wires or other conductive lines that respectively connect electrodes 110 and 112 (not shown in FIG. 3 for clarity) to current pulse generating system 114, as shown more clearly in FIG. 4.

Figure 5:
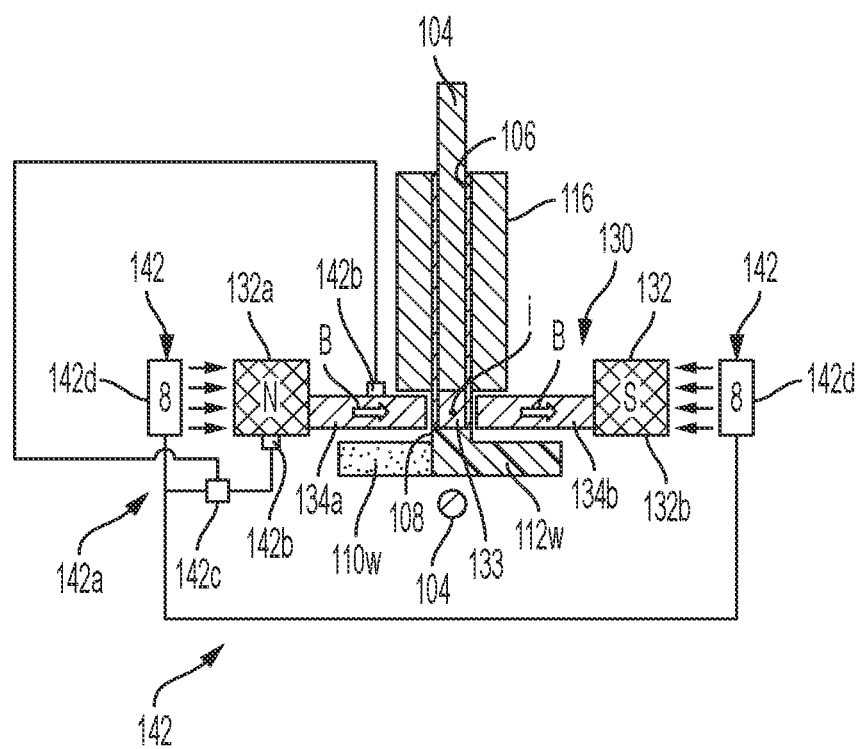
FIG. 5 illustrates a schematic side view of a printer jetting mechanism in which the magnetic field source is a flux circuit comprising a magnet and a flux guide, according to an embodiment of the present disclosure.

In another embodiment, as shown in FIG. 5, the magnetic field source 130 is a flux circuit comprising a magnet 132 for providing a magnetic flux density, B, and a flux guide 134. In an example, a first portion of the flux guide 134a is attached to a north pole 132a of a magnet 132 (FIG. 5). A second portion of the flux guide 134b is attached to a south pole 132b of a magnet 132. North pole 132a and south pole 132b can be, for example, two ends of the same magnet, or two ends of two different magnets. Opposing ends of the portions of flux guide 134a and 134b are positioned proximate the ejector nozzles 108 and conduct or guide the magnetic flux so as to immerse the ejector nozzle 108 in the desired magnetic field. The magnet 132 can be any magnetic field generating device, such as a permanent magnet or electromagnet.

For purposes of the present disclosure, the term "flux guide" can be taken to mean any member or other device that is capable of constraining the path of magnetic flux and guiding it to a target volume. In an embodiment, the flux guide 134 is a member comprising any suitable material for guiding magnetic flux. As an example, the flux guide is a member shaped to carry magnet flux from the magnetic field generating device to a desired target volume and that comprises a material that has one or both of high permeability and high magnetic saturation at the operation temperatures in the vicinity of the ejector nozzle 108. In an example, the material can have the desired magnetic saturation (e.g., about 0.1 to about 2 Teslas, such as about 0.5 to about 2 Teslas) at the desired operating temperatures, such as any of the operating temperatures described herein. Examples of such materials include nickel, nickel alloys, cobalt, cobalt alloys, iron and iron alloys, where the alloys can include combinations of nickel, cobalt and/or iron, as well as other materials, such as silicon (e.g., silicon iron and silicon steel). Any other type of magnetic flux guide can also be employed.

Wiring 110w and wiring 112w in FIG. 5 represent wires or other conductive lines that respectively connect electrodes 110 and 112 (not shown in FIG. 5 for clarity) to current pulse generating system 114, as shown more clearly in FIG. 4. When a current, i, (represented by a dot and flowing in a direction into or out of the page in FIG. 5) is pulsed through a conductive print material 4 between electrodes 110, 112 in ejector nozzle 108, the current flow being in an averaged direction that is substantially perpendicular (e.g., perpendicular or within 10% of perpendicular) to the averaged direction of the magnetic field 133, (averaged direction shown as flux density, B), a Lorentz force is generated on the conductive print material 104 through which the current flows. For illustration purposes, the averaged direction of current, i, shown as a dot in FIG. 5, is into the page. One of ordinary skill in the art would understand that the realized force on the liquid in an ejector conduit can be calculated as an integral of $i(xyz) \times B(xyz)$ over the volume of liquid where i and B intersect, where x,y and z represent the Cartesian Coordinates describing that volume. The term "averaged direction" as used here is meant to indicate an approximated average direction of current and an approximated average direction of magnetic flux over the entire volume of liquid where i and B intersect in an ejector conduit. One of ordinary skill in the art would understand how to determine averaged directions for flux density and current.

Generally speaking, the Lorentz force will be proportional to the cross-product of the current, i, and the flux density, B. Therefore, the higher the flux density of the magnetic field at the region of the ejection nozzle 108 where the current is pulsed through the print material 104, the higher the Lorentz force on the print material 104 given a constant current pulse amplitude. Therefore, providing a higher magnetic flux density can allow for a smaller current pulse amplitude while still providing a desired ejection force for the print material 104.

The flux density realized at the current pulse region of the ejector nozzle 108 will be dependent on the magnetic field strength of the magnetic field source 130, the proximity of the magnetic field source 130 to the current pulse region, the shape of any flux guide, and the nature of the medium through which the magnetic field extends (e.g., the type of conductive print material 104). In an embodiment, the magnetic field source 130 is positioned in relatively close proximity to the current pulse region of the ejector nozzle 108 in order to provide the desired flux density. This can be accomplished by positioning either the magnet 132 or flux guide 134 of the magnetic field source 130 sufficiently close to the nozzles 108 to provide a desired flux density of, for example, about 0.1 to 2 Teslas, such as 0.5 to 2 Teslas. Example distances, $X_{mn}$, between the magnetic field source 130 and a longitudinal axis, $\ell_i$, of the passageway 106C of the ejector nozzles 108 include ranges of from about 0.1 mm to about 10 mm, such as about 0.5 mm to about 5 mm, or about 1 mm to about 2 mm, where $X_{mn}$ is the closest distance between i) the longitudinal axis, $\ell_i$, of passageway 106C of the ejector nozzle 108 and 2) either the magnet 132 (if there is no magnetic flux guide) or the flux guide 134 (in the case where the magnetic field source 130 is a flux circuit).

The ejector nozzles 108 may operate at or above the melting temperature of the conductive print materials being ejected. These temperatures will often be over 400° C. Such high temperatures can result in reduced magnetic strength and/or complete loss of magnetism for many magnetic materials. An advantage of employing a flux circuit comprising a magnet 132 and a flux guide 134 as the magnetic field source 130 is that the magnet 132 can be maintained a distance from the ejector nozzles, thereby allowing the magnet to more easily be kept at a reduced operating temperature compared with the temperatures proximate the ejector nozzles 108.

Figure 6:
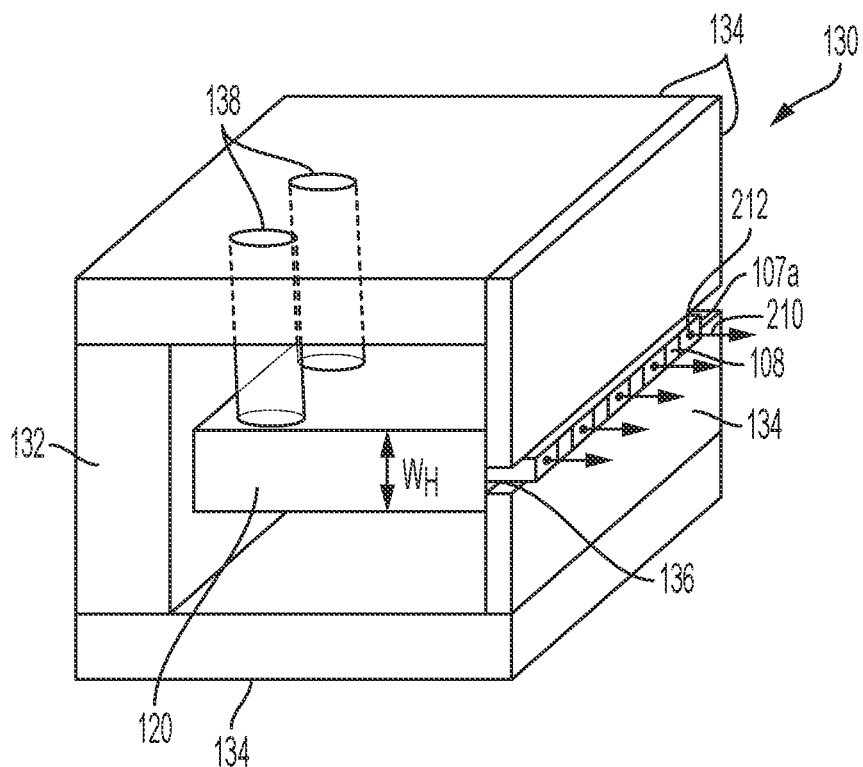
FIG. 6 illustrates a schematic, perspective view of a printer jetting mechanism in which the magnetic field source is a flux circuit comprising a magnet and a flux guide, according to an embodiment of the present disclosure.

If desired, a cooling system 142 (FIG. 5) for cooling the magnet 132 can also be employed, either for cooling the magnet 132 employed alone or with a flux guide 134, in order to maintain the magnet 132 (and optionally the flux guide 134) within desired operating temperatures so as to avoid reductions in magnetic field strength. Any suitable cooling system 142 can be employed, such as a forced fluid cooling system in which a cooling gas and/or cooling liquid is circulated by a mechanical system, such as a pump, fan, blower, compressor or any combination thereof, to cool the magnetic materials. Examples of such systems can include refrigeration systems, forced air systems and systems for flowing a fluid, such as water or other liquid, to cool the magnet (e.g., a radiator and heat conduction path from magnetic materials to the water or other fluid cooled by the radiator). In an example, the cooling system 142 can comprise a feedback loop 142*a* that includes one or more temperature sensors 142*b* (e.g., thermocouples) positioned proximate the magnet and/or the flux guide for determining temperature of the magnet/flux guide and a controller 142*c* (e.g., manual controller or automated controller having a computer processor) for increasing or decreasing the cooling output of a cooler 142*d* (e.g., pump, fan, blower, compressor or any other desired cooler, including any cooler taught herein) of the cooling system to maintain a desired temperature. Any other suitable cooling system 142 can be employed for cooling the magnet 132 and/or flux guide 134. In addition to or in place of cooling system 142, the magnets and/or flux guides can be thermally isolated from heat from the ejector conduits by any suitable insulator. FIG. 6 illustrates an example of a suitable insulator 139, which can comprise, for instance, one or both of a thermal insulating material or an evacuated chamber positioned between the ejector conduits and the magnets and/or flux guide. For instance, insulator 139 can optionally include a thin vacuum gap, represented by the hatched region of the insulator 139, disposed between an outer chamber wall or layer and the magnetic field source 130, where the outer chamber wall or layer are represented by the outer line of insulator 139.

Figure 7:
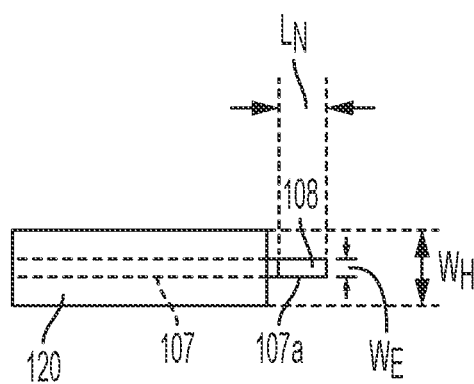
FIG. 7 illustrates a schematic, side view of the ejector conduit array employed in the printer jetting mechanism of FIG. 6, according to an embodiment of the present disclosure.

An example of a flux circuit comprising a magnet 132 and a flux guide 134 is shown in FIG. 6. The flux guide 134 is configured as a closed flux loop everywhere except in gap 136 in which the ejector nozzles 108 of the array 107 (FIG. 7) are positioned so as to allow ejection of print material 104. Ejector nozzles 108 are positioned in an extended portion 107*a* of array 107 that has a width dimension, $W_E$, that is shorter than a width dimension, $W_H$, of the ejector housing 120, so as to fit within the gap 136, thereby decreasing the distance between the flux guide 134 and the pulse region in the ejector nozzles 108. For example, $W_E$ can range from about 0.2 mm to about 10 mm, such as about 0.5 mm to about 2 mm, and $W_E$ can range from about 0.5 mm to about 100 mm, such as about 1 mm to about 10 mm. As another example, $W_E$ can range from about 70% to about 1% the size of $W_H$, such as about 50% to about 10%. This can allow for an increased flux density in the pulse region, which has the advantage of allowing for a reduced current while providing for a desired ejection force on the print material, as discussed herein. Pass through conduits 138 can provide a flow of print material 104 to the array 107 as part of a feeder mechanism.

In an embodiment, the magnetic field source 130 is not integrated into the array 107 (e.g., is positioned proximate to, but not incorporated within the array of ejector conduits itself). In an embodiment, the magnetic field source 130 is positioned on opposing sides of ejector nozzles 108, and parallel with the length of the array of nozzles, as shown, for example, in FIGS. 2, 6 and 16. This arrangement allows the ejector nozzles of a given row of the array to be more densely packed, at least because the magnetic field source 130 is not positioned between the ejector conduits 106 of any given row. Where the array 107 comprises two rows of ejector conduits 106, a magnetic field source 130*a* is optionally positioned between the rows, as shown, for example, in FIG. 16.

Referring again to FIGS. 1 and 4, sufficient current is provided to electrodes 110, 112 to provide the desired momentum to eject, or jet, at least a portion of the print material 104 from the ejector nozzles 108. The amount of current and length of current pulse can be determined by one of ordinary skill in the art. Electrodes 110 and 112 can be configured to provide electrical contact with the conductive print material 104. As an example, if the print material is a solid filament, one or both of electrodes 110, 112 can be lightly sprung using any desired spring mechanism 113 (FIG. 9) or other electrode design that will positionally bias one or both of the electrodes in a direction transverse to, and towards, the longitudinal axis, $\ell$, of the passageway 106C. In this manner, the electrode(s) are forced against the print material 104 when the print material 104 is fed into the nozzle 108 during operation of the ejector. Suitable spring mechanisms and/or electrode designs that can provide such a biased contact force against the filament can be determined by one of ordinary skill in the art.

The electrodes 110, 112 can comprise any material suitable for providing electrical contact to the print material 104 while withstanding ejector nozzle temperatures during printing. Examples of suitable materials include metals with higher melting temperatures than the print material, including refractory metals as described herein, aluminum, aluminum alloys (e.g., 1000 series, 2000 series, 3000 series, 4000 series, 5000 series, 6000 series, such as 6061 and 6063, and 7000 series aluminum alloys), magnesium, magnesium alloys, iron, iron alloys (e.g., steel), copper, copper alloys (e.g., zinc), nickel, nickel alloys, titanium, titanium alloys, silver and silver alloys. Suitable alloys of the above named metals can comprise mixtures of any desired metals, such as mixtures of two or more of any of the above named elemental metals, including the elemental refractory metals, such as, for example, mixtures of two or more of aluminum, magnesium, iron, copper, nickel, titanium, tungsten or any of the other elemental refractory metals, palladium, silver, any of the other refractory metal alloys listed herein, and so forth. The electrodes 110 and 112 can be corrosion resistant. For example, any of the electrodes 110 and 112 described herein are optionally coated with a passivation coating 144 (e.g., FIG. 9) comprising a noble metal, such as palladium, that resists corrosion by the molten print material. In an example, any of the electrodes herein can comprise tungsten, another refractory metal, copper or any of the other metals taught herein as being suitable for electrodes and are coated with a passivation layer comprising a noble metal, such as palladium. Employing noble metals as corrosion resistant coatings on electrodes is generally well known.

The current pulse generating system 114, which is also referred to herein as a current pulse generating circuit, has the capacity to generate a pulse of current with sufficient amplitude to provide the desired electromagnetic force (e.g., Lorentz force) induced momentum of the print material 104 in a relatively short period of time (e.g., a single current pulse). The current pulse creates sufficient momentum of the print material, arising from the generated electromagnetic force, to cause detachment and ejection of the print material 104 from the ejector nozzle 108 during operation of, for example, a 3D printer. Any type of current pulse generating circuit that can provide a desired pulse of sufficient amperage to eject the print material can be employed. Suitable current pulse generating circuits are well known in the art and any desired current pulse generating system can be employed. The current pulse generating system is in electrical connection with one or more of any of the electrode pairs (e.g., all of the electrode pairs) in the ejector devices described herein, such as the first electrode 110 and second electrode 112 of the ejector nozzle, as shown, for example, in FIGS. 4, 10 and 11. In an embodiment, the current pulse generating system 114 comprises a current source in electrical connection with the ejector nozzle 108 (e.g., the current source connected to the first electrode 110 and a current sink in electrical connection with the second electrode 112 of the ejector nozzle). In another embodiment, the current pulse generating system 114 comprises a voltage source in electrical connection with the ejector nozzle 108 (e.g., so as to apply a desired voltage between the first electrode 110 and the second electrode 112 of the nozzle). Examples of suitable current sources and voltage sources are well known in the art.

Referring to FIG. 4, a circuit of the current pulse generating system 114 can comprise a power supply 114a and at least one current switch 114b operated by at least one pulse control device 114c, such as a pulse generator, waveform generator or other device capable of generating the desired current pulses. While they are shown separately, the switch 114b may optionally be part of the pulse control device 114c. The pulse control device 114c can be programmable so as to provide for computer control of the current pulse generating system. The power supply 114a can be any power supply, such as a DC power supply or switching power supply, able to supply the desired current. The switch 114b can be any switch capable of providing the desired current pulse in conjunction with the pulse control device 114c. Examples include high current capable switches, including FETs or MEMS switches. Other circuit components can optionally be included, such as amplifiers, resistors and so forth, as would be understood by one of ordinary skill in the art. The current pulse generating system 114 can be electrically connected to the print material in ejector nozzle 108 using electrodes 110 and 112, as described herein.

Figure 10:
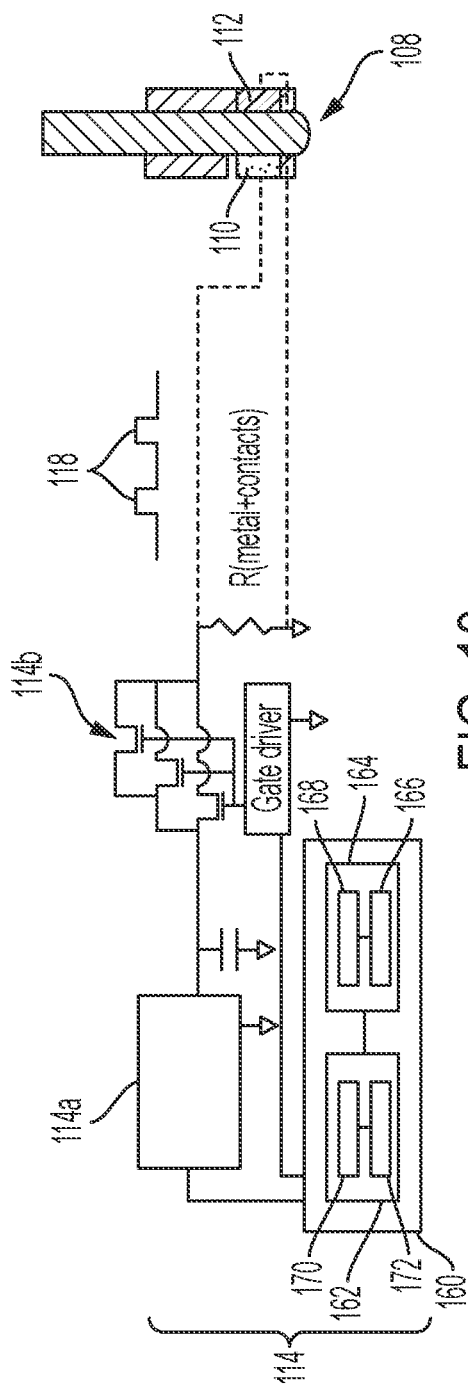
FIG. 10 illustrates an example of a schematic cross-sectional view of an ejector conduit. A current pulse generating system is also illustrated that can be employed to generate a current pulse across electrodes positioned in an ejector nozzle of the ejector conduit, according to an embodiment of the present disclosure.

FIG. 10 illustrates an example of a current pulse generating circuit that can potentially be employed to provide a relatively high current pulse over a small duration of time at a low duty cycle. The current pulse generating system 114 of FIG. 10 employs a power supply 114a, which is a DC power supply, such as a switching power supply, and a plurality of FETS (e.g., GaAs FETS or other FETS) that act as switches 114b, to charge one or more capacitors. The current pulse generating system 114 of FIG. 10 is electrically connected to the print material in ejector nozzle 108 using electrodes 110 and 112, as described herein. The charged capacitor(s) can be discharged to provide the desired current pulse 118 across the print material. General circuit designs can employ DC voltage supplies, high power operational amplifiers with a current feedback resistor, and/or fast, low series-impedance switches, such as GaAs nMOS transistors. Such circuits are generally well known. Rapid bipolar switching can be similarly applied using, for example, high current H-bridges. Any other suitable current pulse generating circuit capable of providing suitable current pulses can be employed.

The resistivity of the print material will vary as it is heated and/or changes phase, which can be taken into account when determining the desired amplitude and/or duration of the current pulse. If desired, the amount of current supplied by the current pulse generating system 114 can be intentionally varied over the duration of the current pulse 118 in order to provide the desired amperage to the print material despite changes in resistivity that may occur due to heating and/or phase change of the print material 104 caused by the pulse.

In an embodiment, the current pulse generating system 114 comprises a pulse control device that is programable. Pulse control system 160 (FIG. 10) is an example of a programmable pulse control device that comprises a pulse controller 162 and a computation system 164. The pulse controller 162 can be, for example, a microcontroller comprising a CPU 170 and memory 172 that interfaces with the circuit components (e.g., a current switch, power supply and/or other components) of the current pulse generating system 114 to generate current pulses having the desired pulse characteristics when the current pulse is flowed between the first electrode 110 and second electrode 112. The pulse controller 162 can be driven by the computational system 164, which is capable of carrying out computer executable instructions embedded in a non-transitory computer readable medium (e.g., the memory 166 of the computation system 164). The computation system 164 can be integrated as part of the pulse controller 162 itself (e.g., can employ a CPU and memory integrated into the pulse controller 162, such as CPU 170 and memory 172) or can be a separate computer system (as shown in FIG. 10), including, for example, a memory 166 and CPU 168, that interfaces with the pulse controller 162. The computer executable instructions embedded in the non-transitory computer readable medium of the computation system 164 can, among other things, instruct the CPU 168 of the computation system 164 to determine at least one desired pulse characteristic such as pulse length, amplitude and/or pulse shape for ejecting the print material 104 as described herein. The computation system 164 can determine the at least one desired pulse characteristics in any suitable manner, such as by using mathematical algorithms to calculate the pulse characteristics that will provide the desired ejection characteristics of the print material 104, and may, for example, take into account such things as the type of print material, pulse history of the ejector and/or feedback from the printer jetting mechanism. Such feedback can include, for example, real time magnetic flux variations, nozzle temperature, print material temperature and/or other data. Additional computer executable instructions embedded in the non-transitory computer readable medium (e.g., memory 166 or 172) of one or both of the computation system 164 and pulse controller 162, are executed by a CPU of the pulse control system 160 (e.g., CPU 168 and/or CPU 170) to send instructions or electrical signals for causing the voltage source or current source of the current pulse generating system to flow an electrical current between the first electrode 110 and the second electrode 112. The resulting electrical current comprises a current pulse 118 having the at least one pulse characteristic. By controlling the current pulses across the first electrode 110 and second electrode 112, the ejection of the print material 104 can be controlled, including such things as droplet volume, velocity of the ejected print material and ejection rate (e.g., number of ejections per second).

As described above, when determining the desired pulse characteristics, the computation system 164 can optionally compensate for such things as the effect on conductivity, thermal expansion, magnetic flux or other temperature dependent properties of the print material 104 or the system (e.g., effect of temperature on the magnet or flux guide) due to, for instance, the temperature changes at the nozzle 108 caused by changes in duty cycle. For example, in some cases, duty cycle may be high, one pulse quickly following another. This can potentially cause the ejector nozzles 108, the ejector conduits 106 proximate the ejector nozzle and/or the print material 104 contained therein to locally rise in temperature compared to a lower duty cycle situation. Such temperature changes can have effects on print material ejection. By accounting for these effects when determining pulse characteristics, the computation system 164 of the current pulse generating system can control and/or improve the ejection characteristics of the printer jetting mechanism 100.

Figure 11:
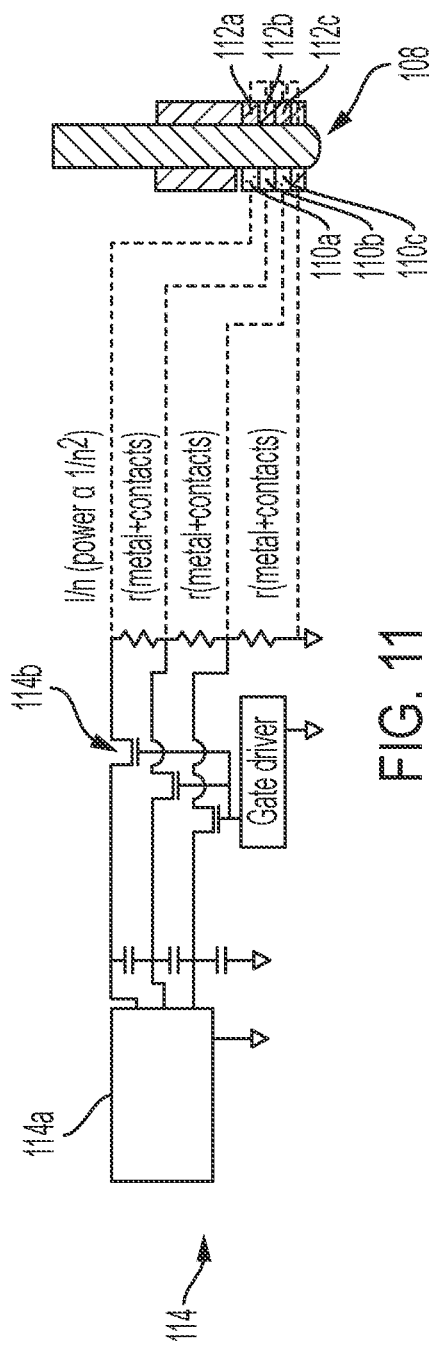
FIG. 11 illustrates an example of a schematic cross-sectional view of an ejector conduit. A current pulse generating system is also illustrated can be employed to generate a current pulse across electrodes positioned in an ejector nozzle of the ejector conduit, according to an embodiment of the present disclosure.

FIG. 11 illustrates a current pulse generating circuit similar to that of FIG. 10, except that the current pulse generating circuit of FIG. 11 can be employed with an ejector nozzle 108 comprising more than one pair of electrodes 110a, 112a; 110b, 112b and 110c, 112c. While three pairs of electrodes are shown, any number of electrode pairs can be employed, such as 1 to 10 electrode pairs, or 2 to 5 electrode pairs. Such a design may potentially allow for improved control and/or higher current density through the print material as compared with the single electrode pair design of FIG. 10. For example, multiple electrodes per nozzle can enable variable volume droplet ejection, where the droplet volume for each ejection can be varied by sending current pulses to a desired number of electrode pairs. Thus, a smaller droplet can be ejected by pulsing current through a single electrode pair 110a, 112a; while larger droplets can be ejected by pulsing current through two electrode pairs 110a, 112a and 110b, 112b, or 3 or more electrode pairs. A pulse control system 160, such as that illustrated in FIG. 10 can also be employed for controlling the current pulse generating circuit of FIG. 11. Any of the devices of the present disclosure can employ multiple electrode pairs in the ejector nozzle(s) 108, similarly as described herein for FIG. 11.

Figure 8:
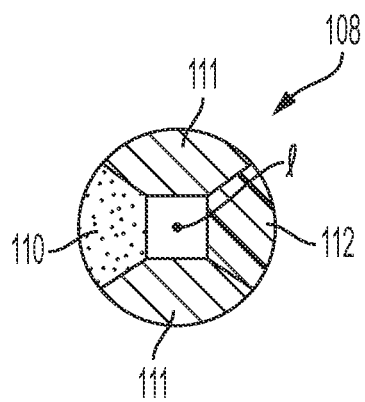
FIG. 8 illustrates a schematic bottom view of an ejector nozzle having a flow path with a square cross-section, according to an embodiment of the present disclosure.
Figure 9:
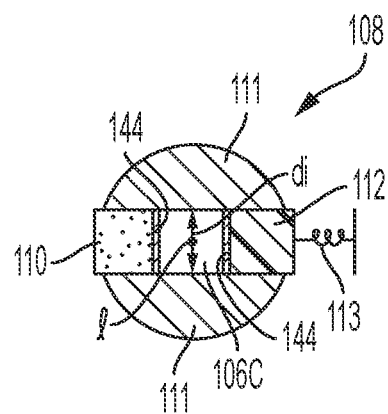
FIG. 9 illustrates a schematic bottom view of an ejector nozzle having a flow path with a square cross-section, according to an embodiment of the present disclosure.

The ejector nozzles 108 are end portions of the ejector conduits 106 and are positioned to eject print material during operation of the printer jetting mechanism 100. The passageway 106C of the ejector nozzle 108 can have a shape that is the same or different than the shape of the passageway 106C of the ejector conduit 106. FIG. 4 shows an ejector nozzle 108 with a passageway 106C that has a circular cross-section bounded by electrodes 110, 112 and an electrical insulator portion 111 disposed laterally between the electrode 110 and electrode 112. The electrical insulator portion 111 comprises an insulating material that can be the same or different from the electrically insulating material of the ejector conduits 106, such as, for example, silica or any of the other insulating materials described herein as being suitable for ejector conduits 106. Examples of ejector nozzles 108 with a square cross-section are shown in FIGS. 8 and 9. The square cross-section may potentially provide a more uniform current distribution flow through the print material 104 than the circular cross-section of FIG. 4. Any other desired cross-sectional shapes, such as other polygons, ovals and so forth, may be employed for the passageways 106C.

Figure 12:
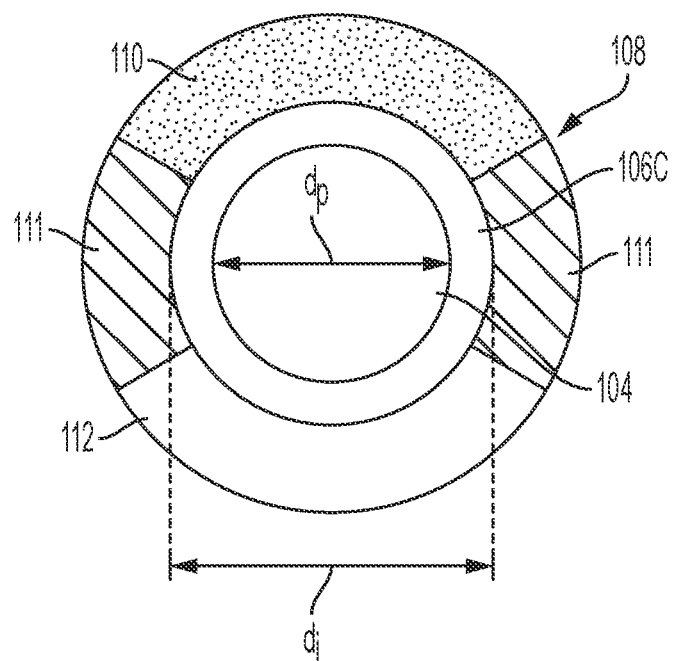
FIG. 12 illustrates a cross-sectional, schematic view of an ejector nozzle having an inner diameter, $d_i$, according to an embodiment of the present disclosure.

Referring to FIG. 12, the ejector nozzle 108 has an inner width, $d_i$, which is the diameter if the cross-section of passageway 106C is circular. If the cross-section of passageway 106C is not circular, $d_i$ is the length of the shortest straight line between opposing insulator portions 111 where the straight line passes through a longitudinal axis, $\ell$, shown in FIGS. 1, 8 and 9 (where the longitudinal axis is going into the page in FIGS. 8 and 9), of passageway 106C. The cross-section of the ejector nozzle 108 to be used for determining $d_i$ lies in a plane that is perpendicular in all directions to the longitudinal axis, $\ell$, at the point where the cross-section intersects the passageway 106C. If there is more than one possible value for $d_i$ (e.g., such as if the value for $d_i$ varies along the length of the ejector nozzle 108), then the $d_i$ is the smallest of the possible $d_i$ values for the ejector nozzle 108. Example values for $d_i$ include, for example, from about 10 microns to about 1000 microns, from about 20 microns to about 500 microns, from about 50 microns to about 200 microns, or about 100 microns. In an embodiment, $d_i$ ranges in size from about 10 microns to less than 100 microns, about 10 microns to about 90, 80, 70 or 50 microns, or about 10 microns to about 25 microns. A length, l, (FIG. 4) of the first electrode 110 and second electrode 112 (or the combined length of the plurality of electrode pairs if multiple electrode pairs are employed, such as in FIG. 11) can be any suitable length, such as, for example, from about 1 to about 10 times the inner width, $d_i$ (e.g., diameter). Examples of suitable values for length, l, are about 10 microns to about 5000 microns, such as about 10 microns to about 1000 microns, such as about 10 microns to about 500 microns, or about 15 microns to about 100 microns (e.g., 90, 80, 70 microns or less). In an embodiment, the electrodes 110, 112 are positioned entirely in the ejector nozzle 108 and/or are positioned at the tip (e.g., the end most position) of the ejector nozzle 108.

The ejector nozzle 108 is an end most portion of ejector conduits 106 and has a length, $L_n$, (FIG. 7) ranging, for example, from about 1 to about 10 times the inner width, $d_i$ (e.g., diameter) of the ejector nozzle 108, as described herein. In other examples, the length, $L_n$, of the nozzle ranges, for example, from about 1 to about 5 times $d_i$, about 1 to about 3 times $d_i$, about 1 to about 2 times $d_i$, or is about equal to $d_i$. In an embodiment, the length, l, of the electrode is equal to the length, $L_n$, of the ejector nozzle.

The design and materials of the ejector nozzles 108 can be the same as or different than the remaining portion of the ejector conduits 106. The total length of the ejector conduits 106, including the length of the nozzles, can be any suitable length, such as, for example, a length that is about 2 to about 100 times, or about 4 to 20 times, the length, l, of the electrodes 110 and 112.

In an embodiment, as illustrated in FIGS. 1 and 2, the passageway 106C of the ejector conduits 106 have a first width at the first end 106A, the first width being wider than the inner width, $d_i$, of the ejector nozzle 108 in order to allow the print material to be easily threaded into the first end 106A for the case that the material is introduced as a solid wire, while allowing passageway 106C to closely fit around the print material within the ejector nozzle 108. In an embodiment, the passageway 106C can gradually taper from the first width to the inner width to avoid print material 104 in the form of a solid filament from being caught in and/or undesirably blocking the passageway 106C.

The feeder mechanism 102 can by any suitable mechanical system, pressure driven system or other system capable of feeding print material 104 to the ejector conduits 106. The feeder mechanisms can comprise one or more pumps, actuators or combination thereof that can function as a mover 102a (FIG. 22) for moving the print material 104. Examples of suitable actuators include electric motors, piezo electric motors, inchworm actuators, hydraulic actuators, and pneumatic actuators. The type of feeder mechanism 102 that is used will depend on the type of print material 104 being employed. In an example, print material 104 comprises a plurality of filaments and the feeder mechanism 102 is a mechanism for advancing the plurality of filaments. The term "filament" or "filaments" for purposes of the present disclosure is defined to include both solid wire-like filaments or liquid filaments, such as liquid filled capillaries or other liquid filled conduits. Examples of feeder mechanisms for solid filaments include spool feeders and inch worm actuators, which are well known in the art. Other feeder devices for ratcheting or otherwise advancing solid print material 104 to the ejector conduits 106 in the form of solid filaments, dry powders or other solid forms can also be employed as the feeder mechanism 102, as would be understood by one of ordinary skill in the art.

In embodiments, the feeder mechanism 102 can be any suitable mechanism for supplying a liquid print material, such as a liquid filament, into the ejector conduits 106 and advancing the liquid print material to the ejector nozzles 108. Examples of suitable feeder mechanisms for liquid print materials include mechanisms employing capillary forces and/or overpressures sufficient to advance the liquid from a reservoir or other source of print material (e.g., molten metal) and thereby stably refill the ejector nozzles 108 after ejection occurs (e.g., the feeder mechanism can be designed to automatically refill the ejector nozzles after an ejection occurs). The feeder mechanisms can comprise, for example, a pump, a feeder conduit and/or print material reservoir configuration that can be filled with print material to provide a hydrostatic pressure head (e.g., by maintaining a certain fill level of print material in the reservoir), or any other device for applying overpressure. Such feeder mechanisms are well known in the art. One of ordinary skill in the art would be able to readily determine an appropriate feeder mechanism.

In an embodiment, the feeder mechanism 102 can supply the print material to each ejector conduit 106 at a different feed rate. As an example, a feeder mechanism 102 for advancing the plurality of filaments comprises a separate mechanism for incrementally advancing each of the plurality of filaments at a separately controllable feed rate. Thus, in an embodiment, as the ejection rate at each ejector is increased or decreased as desired for printing, the feed rate is able to satisfy replenishment of print material 104 to the ejector nozzles before the next ejection.

At least a portion of each of the plurality of ejector conduits 106 comprises an electrically insulating material that provides suitable electrical insulation to avoid electrical shorting during operation of electrodes 110,112. The electrically insulating material can be chosen to withstand process temperatures while maintaining desired structural integrity. In an embodiment, the entire ejector conduits 106, except for the electrodes 110 and 112, can be electrically insulating materials, as shown for example, in FIG. 1. In an embodiment, the conduits 106 can comprise an electrically conductive material clad with an insulating material. The electrically insulating material employed for conduits 106 can be, for example, a refractory material, such as a refractory material chosen from metal oxides (e.g., glass, such as doped or undoped silica), ceramics and combinations thereof. For purposes of the present disclosure, the terms "refractory material" and "refractory materials" are broadly defined as any materials that have a melting point of 1000° C. or more at 1 atmosphere pressure. For example, the refractory material can have a melting point ranging from 1000° C. to about 4000° C., such as about 1200° C. to about 4000° C., or about 1400° C. to about 3500° C., or about 1700° C. to about 3500° C., or about 2000° C. to about 3500° C. Ejector conduit can comprise non-refractory materials that have melting points outside of these ranges. For example, where the print material 104 is a conductive solder material, ejector conduits can potentially be made of materials with melting points lower than 1000° C., such as 800° C., 700° C., 500° C. or lower.

Figure 13:
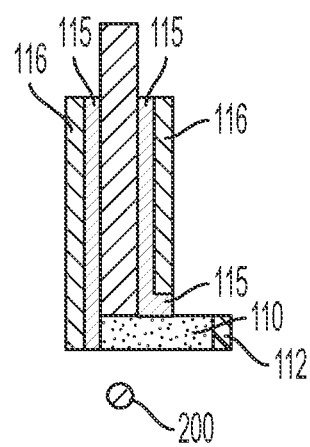
FIG. 13 illustrates a schematic, cross-sectional side view of an ejector conduit, according to an embodiment of the present disclosure.
Figure 14:
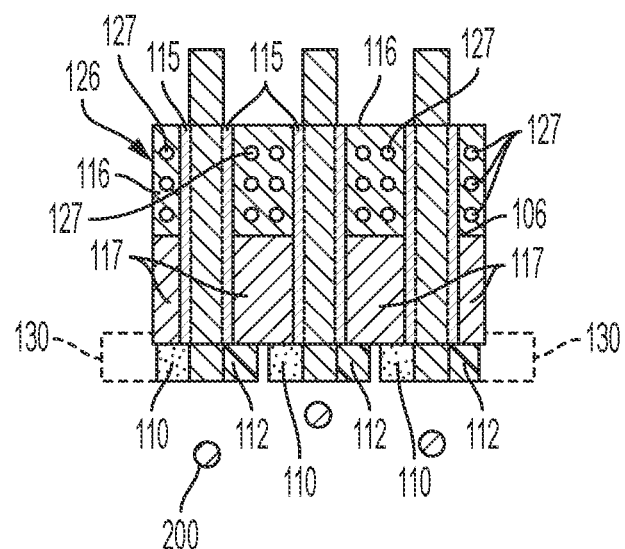
FIG. 14 illustrates a schematic view of an array of ejector conduits with a magnetic field source shown in background, according to an embodiment of the present disclosure.

In an embodiment, the ejector conduits 106 comprise a combination of electrically insulating materials and other materials, such as where at least a portion of each of the plurality of ejector conduits 106 comprises a thermally conductive material, such as a metal. The thermally conductive materials can be employed to transfer thermal energy from heater mechanisms 126 (FIGS. 2, 9 and 11) to the print material 104 in order to raise and maintain the temperature of the print material 104, as desired. Heater mechanisms 126 will be described in greater detail below. FIG. 13 illustrates an example of one such embodiment wherein the ejector conduits 106 comprise an inner conduit portion 115 that is electrically insulating and an outer conduit portion 116 that comprises a thermally conducting material that is different than the electrically insulating material of the inner conduit portion. FIG. 14 comprises yet another example configuration in which ejector conduits 106 arranged in an array each comprise an inner conduit portion 115 that is electrically insulating. A first outer conduit portion 116 is positioned to surround an upper region of the inner conduit portions 115. The first outer conduit portion 116 comprises a thermally conductive material. A second outer conduit portion 117 is positioned to surround a lower region of the inner conduit portions 115. The second outer conduit portion 117 comprising a second electrically insulating material, which can be the same as or different than the electrically insulating material of the inner conduit portion 115. While the second outer conduit portion 117 appears about as thick as first outer conduit portion 116 in FIG. 14, the second outer conduit portion 117 can be thinner than first outer conduit portion 116, so long as sufficient electrical insulation is provided between electrodes 110 and 112 and any electrically conductive materials being employed in conduits 106. In yet another embodiment, inner conduit portion 115 is sufficiently thick to provide electrical insulation for electrodes 110 and 112 (e.g., such as where inner conduit portion 115 is thicker than a width of electrodes 110 and 112), in which case first outer conduit portion 116 can extend the full length of the ejector conduits 106. Various other designs for ejector conduits 106 can be implemented. The electrically insulating materials for inner conduit portion 115 (FIGS. 13 and 14) and second outer conduit portion 117 can include, for example, any of the electrically insulating materials described herein for use as the ejector conduits 106. The outer conduit portion 116 of FIGS. 13 and 14 can comprise any thermally conductive material that provides effective thermal conductivity for transferring heat to the print material 104 and that can withstand process temperatures while maintaining structural integrity. Examples of thermally conductive materials include graphite, refractory metals or other metals with a suitably high thermal conductance and melting point for the printing application, such as copper, copper alloys, platinum and platinum alloys, and combinations thereof. The term "refractory metal" or "refractory metals" as used herein is defined to include the elemental refractory metals and alloys thereof, including, for example, niobium, molybdenum, tantalum, tungsten, rhenium, titanium, vanadium, chromium, zirconium, hafnium, ruthenium, rhodium, osmium, iridium and alloys of any of these metals, such as alloys of two or more of any of the refractory metals listed herein or alloys of one or more of the refractory metals with other metals, such as iron, nickel, copper, silver or others. Suitable refractory metal alloys are known in the art.

Referring to FIG. 2, the plurality of ejector conduits 106 are supported within an ejector housing 120. The ejector conduits 106 can be separate structures from the housing material and can be mounted in any suitable fashion to the ejector housing 120. In an alternative embodiment, the plurality of ejector conduits can be integral with the ejector housing 120. For example, the conduits can be formed as capillaries or larger conduits bored or otherwise formed directly in the housing material. The conduits can optionally be coated to provide an inner surface of the ejector conduits 106 comprising a material that is different from, but integral with, the ejector housing 120. Techniques for forming such conduits directly in the housing material, as well as techniques for coating the conduits, are generally well known. In embodiments, the ejector conduits 106 can comprise a different material or the same material as the ejector housing 120.

The ejector housing 120 comprises any suitable materials that can withstand jetting process temperatures and that can provide the desired support for the ejector conduits 106. Examples of suitable housing materials include materials chosen from metals, such as aluminum, copper, brass and steel, refractory metals, ceramics, other refractory materials, polymers that are capable of withstanding process temperatures (e.g., polymers with melting points of 150° C. to 650° C. or higher, such as 200° C. to 300° C.) and combinations thereof, such as metal coated ceramics and ceramic coated metals. An example of a composite housing material is copper clad with a ceramic, such as mullite, where the copper and mullite have similar thermal expansion coefficients. The specific material employed can depend on the print material to be jetted.

In an embodiment, the printer jetting mechanism 100 comprises a heater mechanism 126 for heating at least a portion of the ejector conduits 106 and optionally the ejector housing 120 surrounding the ejector conduits 106 during operation of the three-dimensional printer, as shown for example in FIGS. 2, 14, 15 and 16. In the embodiment, referring to FIG. 15, the heater mechanism 126 is capable of maintaining the temperature of a reservoir 140 at or above the melt temperature of the print material 104. The reservoir 140 is in fluid connection with the plurality of ejector conduits 106. In an example, heater mechanism 126 can provide sufficient thermal energy so as to bring the print material 104 to a temperature that is at or above melting temperature of the print material 104 and maintain the print material 104 at or above the melt temperature while it is held in reservoir 140 and flowed from the reservoir 140 through ejector conduits 106 to nozzles 108. The ejector conduits 106 can be configured the same as any of the ejector conduits described herein.

In an embodiment, referring to FIG. 14, heater mechanism 126 can provide sufficient thermal energy so as to melt the print material 104 from a solid into a liquid prior to flowing the print material into ejector nozzles 108 and/or to maintain the print material 104 in liquid form; or alternatively raise the print material 104 to a temperature that is just below the melt temperature. If the print material 104 is not melted prior to entry into ejector nozzles 108, then the electric pulse or pulses between electrodes 110, 112 can both melt the print material 104 in the nozzle and supply the Lorentz force for ejection. However, melting the print material 104 prior to flowing the print material into the ejector nozzles 108 can provide certain advantages, such as ease of transporting the print material in liquid form through the conduits 106 and into the ejector nozzles 108 and the ability to avoid having to both melt the print material 104 and provide the ejection force using one or more current pulses, which may potentially increase the number of possible ejections per unit time.

Figure 15:
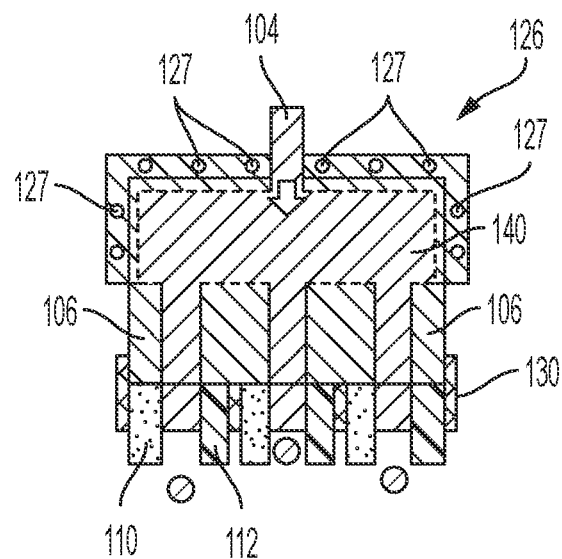
FIG. 15 illustrates a schematic view of a printer jetting mechanism, according to an embodiment of the present disclosure.

Heater mechanism 126 can comprise, for example, any suitable type of resistive heater, inductive heater, radiant heater or combination of any of these. For instance, heater mechanism 126 comprises heating elements 127 that are positioned around the reservoir 140 or conduits 106, such as illustrated in FIGS. 14 and 15. The heating elements 127 can be in the form of resistive heating coils or induction coils, as examples. As an example, a suitable resistive heater mechanism comprises an ohmic meander trace embedded in the housing or surrounding the ejector conduits 106 and/or the reservoir 140 The heater mechanism 126 is separate from the current pulse generating system 114 and/or electrodes 110, 112.

In an embodiment, the array of ejector conduits 106 includes M columns of ejector conduits arranged on an X axis and N rows of ejector conduits arranged on a Y axis, where M is an integer ranging, for example, from about 2 to about 1000 and N is an integer ranging from 1 to 2. For example, M is 3 and N is 1 for the array of FIG. 2, while M is 3 and N is 2 for the array of FIG. 16. In other examples, M is an integer ranging from about 5 to 1000, 50 to 1000, 100 to 900, 250 to 750 or 500 to 1000.

Figure 16:
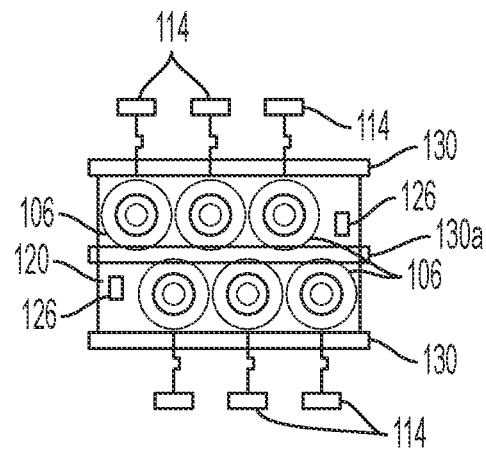
FIG. 16 illustrates a top, schematic view of a printer jetting mechanism comprising columns of ejector conduits that are staggered, according to an embodiment of the present disclosure.

In an embodiment, the rows of the ejector conduits 106 are arranged linearly and the ejector conduits 106 in each row are staggered with respect to the ejector conduits of adjacent rows to facilitate closer packing, as shown, for example, in FIG. 16. In an alternative embodiment (not shown), the columns of the ejector conduits 106 are arranged linearly and the ejector conduits 106 in each column are staggered with respect to the ejector conduits of adjacent columns. Multiple arrays can be stacked to extend the number of rows or columns in a system, as desired.

Figure 17:
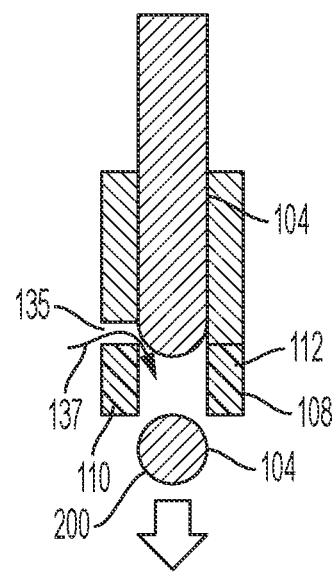
FIG. 17 illustrates a schematic, cross-sectional side view of an ejector conduit comprising a vent, according to an embodiment of the present disclosure.
Figure 18A:
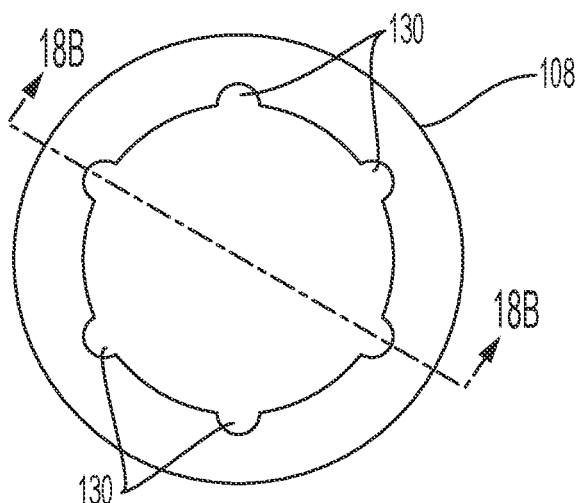
FIG. 18A illustrates a schematic, bottom view of an ejector nozzle comprising a plurality of vents, according to an embodiment of the present disclosure.
Figure 18B:
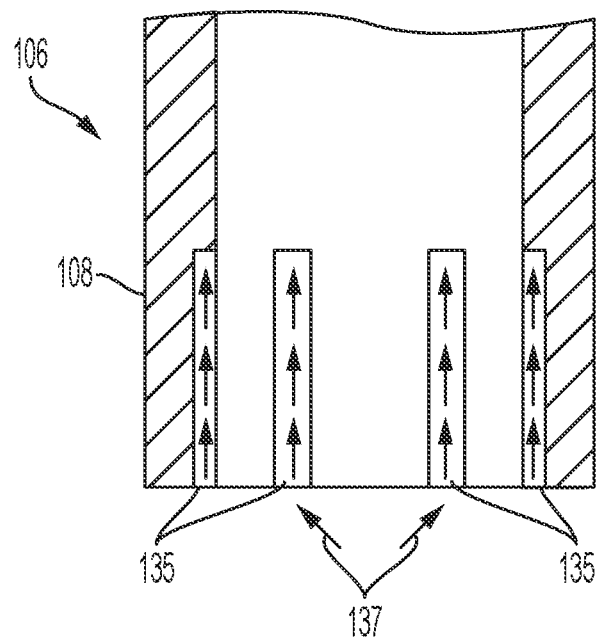
FIG. 18B illustrates a schematic, cross-sectional view of a portion of an ejector conduit 106 that includes the ejector nozzle of FIG. 18A, according to an embodiment of the present disclosure.

Droplet formation during ejection of the print material can occur by any suitable mechanism within or outside of the ejector nozzles 108. In an embodiment, detachment of the print material to form droplets can occur by necking off of the print material inside of the ejector conduits 106, such as within nozzles 108. In such embodiments, the ejector conduits 106 can optionally include one or more vents 135, such as illustrated in FIG. 17. Vents 135 can be positioned in or just above ejector nozzles 108, such as at or near the position in the ejector nozzle 108 where necking off of the print material 104 being ejected from the remaining print material 104 in ejector conduit 106 is to occur during droplet formation. The vents 135 allow air or other ambient gas (as illustrated by arrow 137) to flow into the ejector conduits 106 and/or into the ejector nozzles 108 as the print material 104 is ejected therefrom. This can allow the print material 104 being ejected to more easily be separated from the remaining print material 104 in ejector conduit 106 and/or more easily be ejected from the ejector nozzles 108. The one or more vents 135 can be configured in any manner that will allow ambient gas to flow into the ejector nozzle as the print material 104 is ejected. FIGS. 18A and 18B illustrate another example in which the vents 135 take the form of grooves on the inner surface of the ejector nozzles 108. Any other suitable vent configurations could be employed. In an embodiment, the vents 135, such as in FIGS. 17, 18A and 18B have dimensions that are sufficiently small so that the surface tension of liquid print material 104 would not allow substantial amounts of the print material to flow out of the ejector conduits into the vents 135, while being sufficiently large to allow ambient gas to flow through the grooves and into the ejector nozzle 108. For example, the width and/or length of the vent 135 of FIG. 17 or diameters, in the case of circular shaped vents (not shown), or groove widths of FIG. 18 can be ten or more times smaller than the inner diameter of the ejector nozzle so that penetration of the liquid print material is reduced or eliminated. The vents can be formed by any suitable means, such as by etching techniques or laser ablation that are well known in the art.

The present disclosure is not intended to be limited to any specific droplet formation and/or detaching modes. For example, while the droplets can neck off and detach at a detachment zone inside the ejector conduits 106, it is also possible that the droplets can neck off and detach outside the ejector conduits 106, followed by retraction of undetached print material 104 back into the ejector conduit 106. Thus, a mode of jetting of droplets can include Lorentz force driven "extrusion" of the molten print material 104 out from the ejector nozzle 108 into free space followed by a deacceleration/retraction of the extruded print material 104 as the current pulse is terminated and the print material 104 cools/contracts. Other modes of jetting and/or detaching droplets can also be realized.

Figure 19:
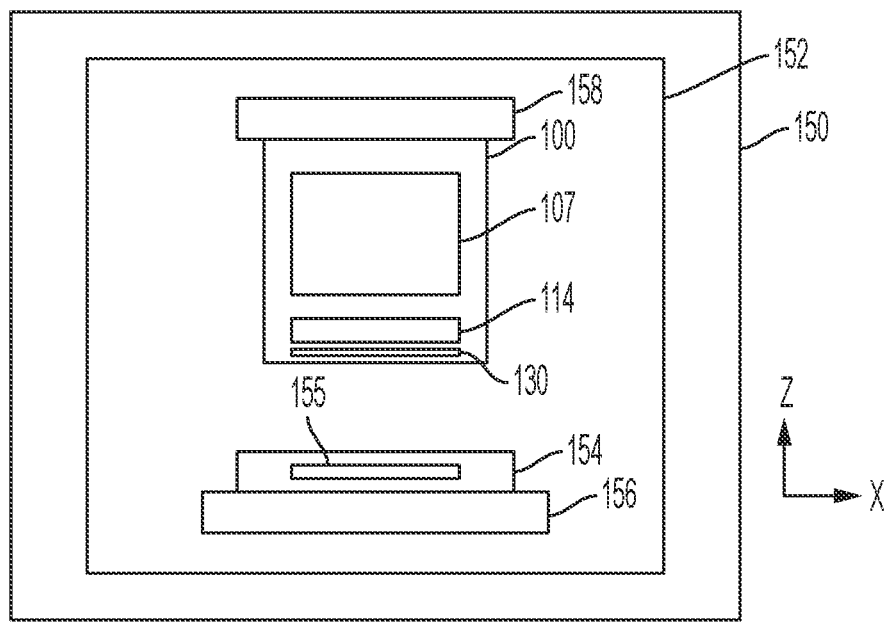
FIG. 19 is a block diagram of a 3D printer, according to an embodiment of the present disclosure.

The printer jetting mechanisms 100 described herein can be employed in any type of printer that is suitable for jetting of a print material. In an embodiment, the printer is a three-dimensional ("3D") printer usable for printing 3D objects. A block diagram of an example 3D printer 150 is shown in FIG. 19. The 3D printer 150 can comprises any of the printer jetting mechanisms 100 comprising an array 107 of ejector conduits 106, as described herein. Additionally, the 3D printer can comprise a positioning system 152 for controlling the relative position of the array 107 with respect to a print substrate 154. The phrase "controlling the relative position of the array 107 with respect to the print substrate 154" means that either one or both of the array 107 and the print substrate 154 can be moved in order to alter the relative position of the array with the print substrate. The relative position of the array 107 with the print substrate 154 is modified during printing so that the print substrate 154 is positioned to receive print material 104 jettable from the plurality of ejector conduits and thereby form a 3D object. The positioning system 152 can comprise one or both of a print substrate handling mechanism 156 for positioning the print substrate 154 and an array positioning mechanism 158 for positioning the array 107 and optionally other parts of the printer jetting mechanism 100, such as portions of, or electrical connections to, the current pulse generating system 114. The print substrate 154 can comprise any substrate on which it is desirable to print a three-dimensional object. An example of a print substrate 154 is a build plate that is part of the 3D printer 150, or other temporary substrate from which the 3D object may be removed after printing. In another example, the print substrate 154 may be intended to be permanently attached to the three-dimensional object after printing, such as, for example, if the print substrate 154 is a printed circuit board on which a portion of a circuit is being printed.

Figure 22:
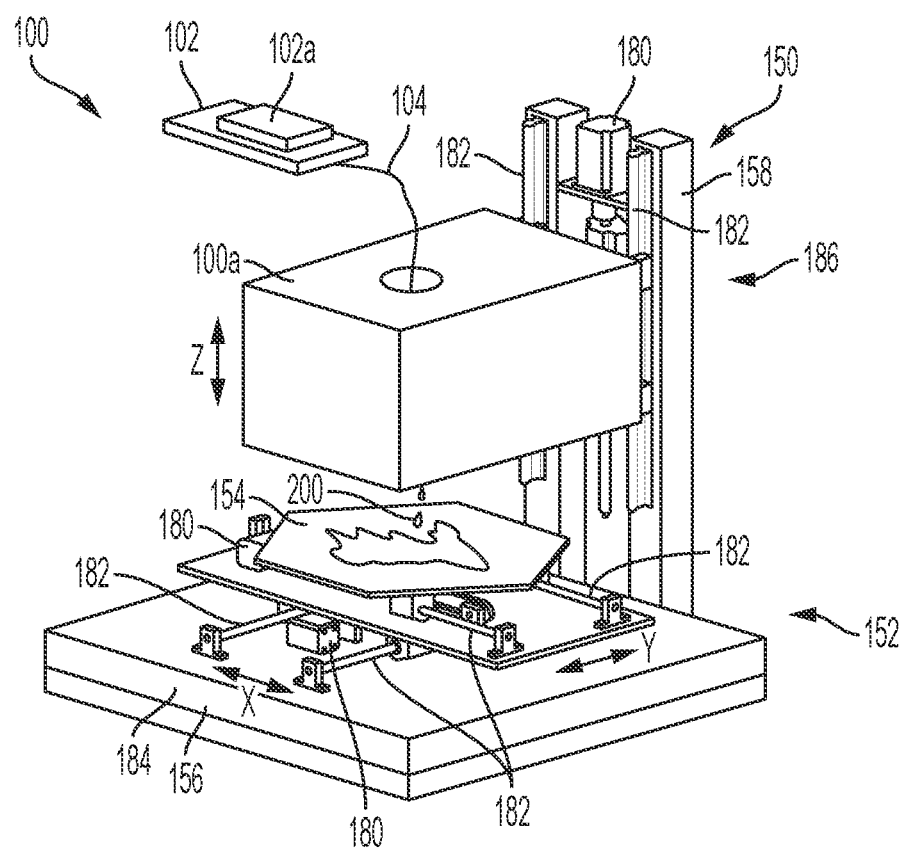
FIG. 22 is a schematic view of a 3D printer, according to an embodiment of the present disclosure.

The print substrate handling mechanism 156 can be any mechanism suitable for positioning the print substrate 154 to receive print material jettable from the plurality of ejector conduits arranged in array 107 during operation of the 3D printer 150. In an embodiment, the print substrate handling mechanism 156 has the ability to position the print substrate 154, such as a build plate or other substrate, by moving the print substrate 154 in a direction along an x-axis, a y-axis and/or a z-axis to a desired position to which the jetted print material is targeted. The array positioning mechanism 158 can be any mechanism suitable for moving the array 107 in a direction along one or more of an x-axis, a y axis and/or a z-axis to a desired position to which the jetted print material 104 is targeted. The positioning system 152, including either or both of the print substrate handling mechanism 156 and the array positioning mechanism 158, can comprise one or more actuators 180 (FIG. 22) that can function as a mover for positioning the print substrate 154 and array 107 relative to each other using, for example, a system comprising tracks 182. Examples of suitable actuators include electric motors, piezo electric motors, hydraulic actuators, and pneumatic actuators. FIG. 22 illustrates an example of such a positioning system 152, which comprises an actuated (e.g., motorized) X-Y stage 184 for supporting the print substrate 154 and a vertical track system 186 on which all or a portion 100a of printer jetting mechanism 100 can be moved using one or more actuators 180 to allow for vertical positioning. Portion 100a of printer jetting mechanism 100 can comprise any of the components of printer jetting mechanism 100 described herein that are attached to the vertical track system 186 for vertical positioning, including the plurality of ejector conduits arranged in an array, all or part of the current pulse generating system and the magnetic field source. The feeder mechanism 102 can be positioned so as not to be directly attached to the vertical track system 186 (as illustrated in FIG. 22), or in other embodiments, can be directly attached to the vertical track system 186. In another embodiment, positioning system 152 comprises an actuated (e.g., motorized) X-Y-Z stage for supporting and positioning the print substrate 154 in three dimensions and the position of portion 100a (e.g., the printhead) of printer jetting mechanism 100 is fixed. It is generally easier to fix the printhead with its attached feeders and support elements and just move the print substrate 154 in 3D. However, any means for relative motion can be used.

As mentioned, the positioning system 152 can comprise one or both of the print substrate handling mechanism 156 and the array positioning mechanism 158. As an example, the print substrate handling mechanism 156 can be used to move the print substrate 154 along both the x-axis and y axis, and the array positioning mechanism 158 can be used to move the array 107 and optionally the entire printer jetting mechanism 100 or any portion thereof along the z-axis, thereby allowing the print substrate 154 and array 107 to be positioned relative to each other in three-dimensions during operation of the 3D printer. As an example, for purposes of this discussion, the x-axis and z-axis are as illustrated relative to a printing operation in FIG. 20, with the y-axis (not shown) being in the direction into the paper; the x-axis and y-axis being parallel to the upper surface of the print substrate 154 and the z-axis being perpendicular to the upper surface of the print substrate 154.

In an embodiment, the print substrate 154 is a build plate and optionally employs a heater mechanism 155, such as resistive heating elements, inductive heating coils, radiative heating lamps or lasers or a combination of two or more of these, positioned within, or proximate to, the build plate 154; or in the case of radiative heating lamps or lasers, positioned so as to allow for impinging of the build plate with radiant energy. The heater mechanism 155 can provide sufficient thermal energy to heat the build plate and/or a 3D object being printed thereon to desired deposition temperatures. Suitable build plates, including build plates with heating mechanisms, are well known in the art.

Methods of Jetting Print Material

An embodiment of the present disclosure is directed to a method for jetting print material from a printer jetting mechanism. As described at 200 of FIG. 21, the method comprises supplying a print material 104 that is electrically conductive to a plurality of ejector conduits 106 (FIGS. 1 and 2) arranged in an array. The ejector conduits 106 comprise first ends 106A configured to accept the print material and second ends 106B comprising ejector nozzles 108. The ejector nozzles 108 can have an inner width (e.g., diameter) ranging, for example, from about 10 microns to about 1000 microns, or any of the other ejector nozzle widths disclosed herein. In the methods described herein, ejector nozzles 108 comprise electrodes 110, 112 for supplying electrical current in the form of electrical pulses through the print material, as discussed in greater detail herein.

Figure 21:
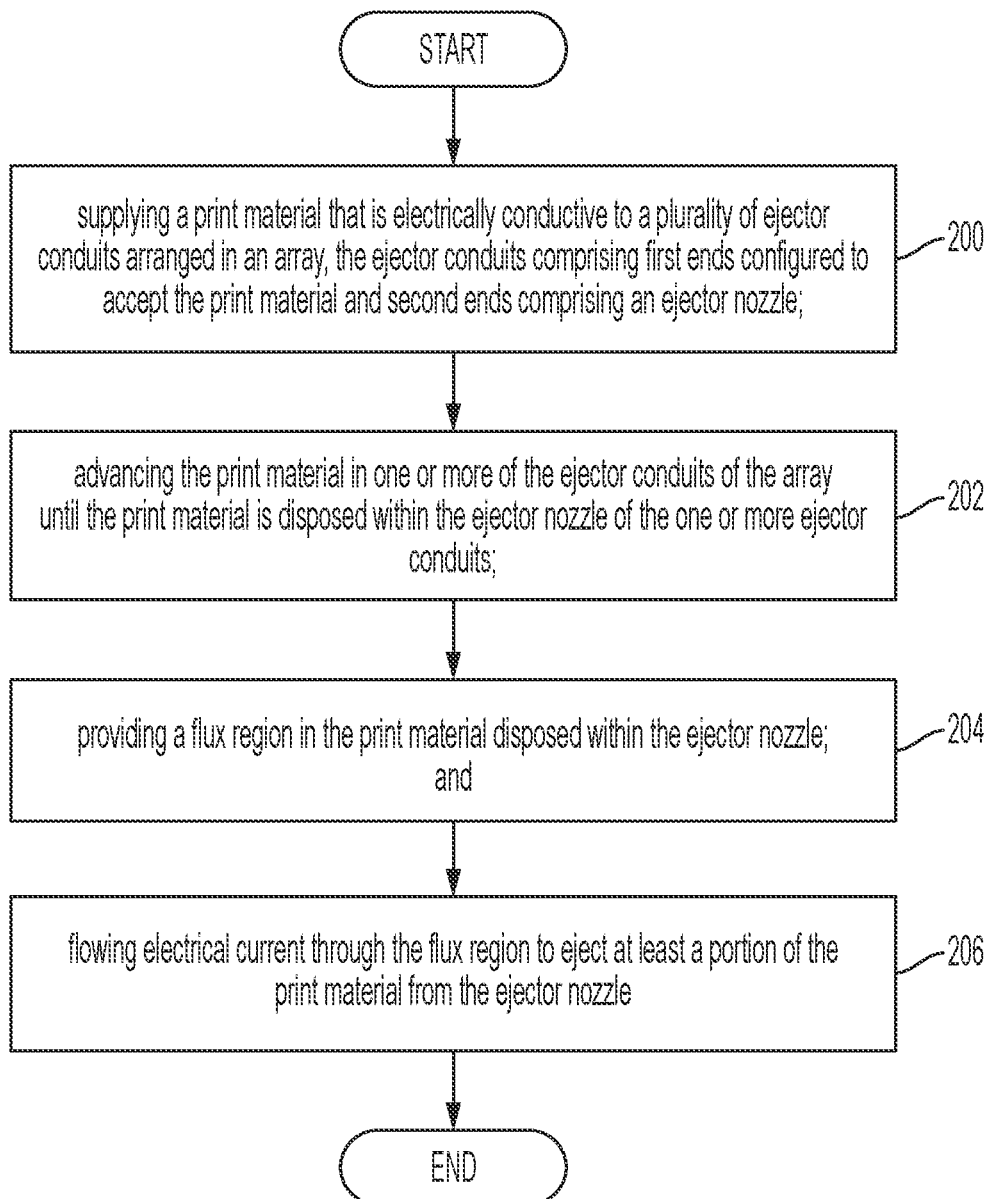
FIG. 21 is a flow diagram of a method for jetting print material from a printer jetting mechanism, according to an embodiment of the present disclosure.

As shown at 202 of FIG. 21, the print material 104 is advanced in one or more of the ejector conduits 106 of the array 107 until the print material 104 is disposed in the ejector nozzles 108. As an example, print material 104 can be advanced to at least partially fill (e.g., completely fill or substantially fill) the ejector nozzle 108.

In an embodiment, print material 104 is supplied as a solid or liquid and then advanced as a liquid phase to the ejector nozzles 108. For example, print material 104 can be supplied in the form of one or more filaments in solid or liquid phase to the reservoir 140 or the plurality of ejector conduits 106. If the print material 104 is supplied as a solid, the print material is heated to melting using, for example, the heater mechanisms 126 as described herein. The melting can occur at any time during advancement of the print material to the ejector nozzles 108. In an example, the melting can occur in the reservoir 140, prior to or just as the print material enters the reservoir 140, or in the plurality of ejector conduits 106. Thus, the print material can optionally be advanced a distance as a solid, and then heated to melting prior to being flowed into the ejector nozzles 108. Once melting occurs, the liquid, or molten, print material 104 is maintained at or above the melting temperature and advanced by flowing the print material to the ejector nozzles 108.

In another embodiment, the print material 104 comprises a plurality of solid filaments that are individually supplied to each of the one or more ejector conduits 106 in a solid form. The solid print material 104 is then advanced separately via passageways 106C at a desired feed rate to each ejector nozzle 108. A current pulse between electrodes 110, 112 can then be employed to melt the print material 104 in the ejector nozzle 108. A second pulse can then be employed to generate the Lorentz force for ejecting the resulting liquid print material from the ejector nozzle 108.

The desired feed rate of print material can be different for each ejector nozzle 108. The feed rate can depend on the rate at which the print material is being ejected from the ejector nozzle 108, which in turn will depend on the number of ejections per unit time from each nozzle and the droplet size per ejection.

As shown at 204 of FIG. 21, a magnetic field is provided in the ejector nozzles 108, thereby forming a flux region 133 in the print material 104 disposed within the ejector nozzles. This can be accomplished, for example, by immersing at least a portion of the ejector nozzles 108 in a magnetic field that is supplied by a magnetic field source 130, as described herein. In an embodiment, the ejector nozzles 108 remain continuously immersed in the magnetic field throughout operation of the printer jetting mechanism 100. In another embodiment, the magnetic field is periodically turned on and off as desired, such as by using a switch to connect and disconnect the flux guide 134 from the magnet 132, or by employing an electromagnet in combination with the flux guide 134 and switching the electromagnet on and off. In this case, the magnetic field is controlled so as to be on when the electrical current is pulsed between electrodes 110, 112 to provide the Lorentz force. In an embodiment, the magnetic field is turned off while a first current pulse between electrodes 110, 112 is used to melt a solid print material in nozzles 108, and then turned on prior to a second current pulse that is used to generate the Lorentz force for ejection of the melted print material.

As shown at 206 of FIG. 21, electrical current is pulsed through the flux region 133 of the print material 104 in at least one of the ejector nozzles to provide sufficient momentum to the print material so as to eject a portion of the print material 104 from the at least one of the ejector nozzles 108 onto, for example, a print substrate. The flowing of the electrical current can comprise, for example, employing a current pulse generating system 114, such as any of the current pulse generating systems herein, to send a current pulse between the first electrode 110 and the second electrode 112.

When a current, i, is pulsed through the conductive print material 4 between electrodes 110, 112 in ejector nozzle 108 in a direction that is substantially perpendicular to the direction of the magnetic field, B, a Lorentz force is generated on the conductive print material 104 through which the current flows. Generally speaking, the Lorentz force, and thus the ejection force, or momentum, of the print material being ejected from the ejector nozzles 108, will be proportional to the cross-product of the current, i, and the flux density, B, in the flux region.

The amount of current and the length of the current pulse used to achieve the desired momentum of the ejected print material will depend on such things as the type of print material, the flux density in the flux region and amount of print material being ejected and can readily be determined by one of ordinary skill in the art. In addition to providing the momentum for ejection, shorter current pulse lengths can also potentially allow for a faster ejection rate (e.g., increased number of ejections of print material per second from the same ejector nozzle).

In an embodiment, immediately after flowing the current pulse through the conductive print material 104 to force a portion of liquid print material 104 to be ejected out of ejector nozzle 108; the direction of current between electrodes 110 and 112 is reversed. Reversing the direction of current reverses the Lorentz force on the portion of print material 104 remaining in the nozzle 108, thereby pulling a portion of the column of liquid print material back into the print nozzle 108. This may serve to increase the force at the necking off point of the liquid print material where the drop is forming so that the drop will more readily break off from the remaining column of print material. In an alternative embodiment, immediately after flowing the current pulse through the conductive print material 104 to force liquid out of ejector nozzle 108 the flow of electrical current is stopped. In this embodiment, the initial pulse of current is sufficient to provide the desired drop formation and ejection of the print material 104 without reversing the direction of current flow between electrodes 110 and 112.

While achieving the ejection of print material 104 using a single pulse of current is taught above, it may also be useful to use more than one pulse of current to achieve ejection, either from the same or multiple pairs of electrodes. For example, 2, 3 or more rapid pulses can be employed to achieve the desired ejection of the print material as opposed to a single longer pulse. In general, any desired waveform can optionally be chosen to optimize fluid flow and ejection.

Drop sizes can be individually selected on-demand. In an embodiment, drop sizes can be varied by varying the current pulse energy for each pulse (e.g., varying pulse length and/or amplitude of the current pulse). In another embodiment, multiple addressable electrode pairs (similar to that shown in FIG. 11, with each electrode driven independently) can be employed to vary the drop volume. Thus, during operation, the current generating system can be used to send an electrical pulse between a first number of electrode pairs in ejector nozzle 108 (e.g., one or more of electrode pairs 110a, 112a; 110b, 112b and 110c, 112c of FIG. 11) to eject a first droplet volume, and subsequently send an electrical pulse between a second number of the electrode pairs to eject a second droplet volume that is different than the first droplet volume, the first number of electrode pairs being different than the second number of electrode pairs. Thus, in this process, the drop size of the print material ejected in the first ejection would be different than the drop size of the print material ejected in the second ejection.

The droplet size per ejection can be selected based on various factors, including the desired size of details in the object to be printed, the particular properties of the print material (e.g., thermal transfer and expansion properties), properties of the current pulse provided to the print material, nozzle size and so forth. Droplets may generally have a diameter size that is as small as the inner diameter of the ejection nozzle 108 but could potentially have significantly larger diameters if longer lengths of print material (e.g., liquid filament) are ejected during a single ejection. In an embodiment, the length of print material ejected in a single ejection (e.g. using a single pulse) is about 1 times to about 10 times the inner width (e.g., diameter) of the print nozzle 108 each time the print material is jetted.

After ejection of the print material 104, additional print material 104 can be advanced to refill the ejector nozzle or nozzles 108 and then the current pulse is repeated to eject additional print material. This process of advancing the print material to refill the nozzles and providing a pulse for ejection can be repeated any number of times as desired for each of the ejector nozzles 108 in the array until the printing is complete, thereby forming a 3D object. During the printing, the ejection of print material 104 can occur from a single ejector nozzle 108 in the array at a time, simultaneously from two or more ejector nozzles 108, and/or simultaneously from all of the ejector nozzles 108 in the array, as desired to accomplish the particular printing process being carried out.

In an embodiment, ejecting at least a portion of the print material comprises flowing a sheath gas proximate the ejector nozzle, the sheath gas comprising one or both of an inert gas and a reducing gas. An example of employing a sheath gas is illustrated by the arrows 210 in FIGS. 3 and 6. The sheath gas flow can be accomplished in any suitable manner, such as, for example, by flowing the sheath gas through sheath gas vents 212 positioned within or proximate to the printer jetting mechanism 100, such as in the array 107 and/or the ejector housing 120. In an embodiment, the sheath gas is maintained at a desired temperature so as to avoid cooling the print material prior to deposition. For example, the sheath gas temperature can be at or above the melting point of the print material. In this manner, the print material can be maintained in a molten state until deposition on the substrate occurs, if desired. In an embodiment, the sheath gas can be moving at approximately the same velocity, and in approximately the same direction, as the droplets when they are ejected.

The magnetic field can be provided by any suitable source, including any of the magnetic field sources described herein. In an embodiment, the magnetic field source comprises a permanent magnet. The method can include cooling the permanent magnet to reduce the temperature of the magnet to be below the Curie temperature, or to be within a suggested operating range, in order to avoid large reductions in magnetic field strength. For example, the magnet can be cooled so as to be maintained at a temperature below 200° C., such as a temperature ranging from about 0° C. to about 160° C. The cooling of the magnet can occur for a magnet 132 employed either with or without a flux guide 134, as described herein. Any suitable cooling techniques can be employed, such as by circulating a cooling fluid proximate the magnet (e.g., by flowing the cooling fluid through conduits (not shown) that are positioned to cool a space surrounding the magnet or by flowing the cooling fluid across a surface of the magnet or flowing coolant through the interior of the magnet or flux guide.) The cooling fluid can be circulated using any suitable mechanical system, such as a pump, fan, blower and/or compressor, to cool the magnet. In an embodiment, the flux guide can be cooled to a desired operating range, instead of or in addition to, cooling the magnet. Any of the techniques and/or cooling systems listed herein for cooling the magnet can be employed for cooling the flux guide.

The printer jetting mechanism can operate at ejector nozzle temperatures that are about the melting temperature of the print material 104 or higher. For example, the nozzle temperatures can range from about 50° C. to about 2000° C., about 100° C. to about 1800° C., about 150° C. to about 1600° C., about 500° C. to about 1000° C., or about 600° C. to about 1000° C. In the case of print materials 104 that are refractory metals, the nozzle temperatures can range, for example, from about 2000° C. to about 3000° C., or about 2000° C. to about 2500° C.

The print material 104 can be any electrically conductive material. In an example, the print material comprises at least one metal. The at least one metal can be chosen from, for example, tin, tin alloys, lead, lead alloys (e.g., solder comprising one or both of tin and lead), aluminum, aluminum alloys (e.g., 1000 series, 2000 series, 3000 series, 4000 series, 5000 series, 6000 series, such as 6061 and 6063, and 7000 series aluminum alloys), magnesium, magnesium alloys, iron, iron alloys (e.g., steel), copper, copper alloys (e.g., zinc), nickel, nickel alloys, titanium, titanium alloys, silver and silver alloys. Suitable alloys of the above named metals can comprise mixtures of any desired metals, such as mixtures of two or more of any of the above named elemental metal print materials (e.g., mixtures of two or more of aluminum, magnesium, iron, copper, nickel, titanium, silver and so forth). In an embodiment, the print material 104 has a metal content of greater than 90% by weight, such as about 95% to 100%, or 98% to 100%, or 99% to 100%, or 99.5% to 100%, or 99.8% to 100% by weight, or 99.9% to 100% by weight.

In an embodiment, the print material 104 has a resistivity of less than $1 \times 10^{-5}$ ohm*m at 20° C., such as about $1 \times 10^{-8}$ ohm*m or about $1 \times 10^{-7}$ ohm*m to about $\times 1 \times 10^{-8}$ ohm*m at 20° C. (e.g., is electrically conductive at room temperature (20° C.)). In an embodiment, the print material 104 has a resistivity of less than $1 \times 10^{-5}$ ohm*m, such as about $1 \times 10^{-8}$ ohm*m to about $\times 1 \times 10^{-8}$ ohm*m, while in a solid form, a liquid form, or while in both solid and liquid forms, and while at a temperature of within 300° C. of the melting temperature. The print material can have any desired melting temperature. In examples, the print material has a melting temperature ranging from about 50° C. to about 3000° C., about 50° C. to about 2000° C., about 100° C. to about 1800° C., about 150° C. to about 1600° C., about 500° C. to about 1000° C., or about 600° C. to about 1000° C. In the case of print materials 104 that are refractory metals, the nozzle temperatures can range, for example, from about 2000° C. to about 3000° C., or about 2000° C. to about 2500° C.

Any of the print materials described herein can be supplied to the ejector conduits 106 in any suitable form, such as a plurality of solid or liquid filaments, powders, or a reservoir of liquid print material. Print material 104 in solid form can have any suitable widths, such as widths (e.g., diameters) ranging from about 1 micron to about 1000 microns or larger, such as from about 10 microns to about 500 microns, about 50 microns to about 200 microns, or about 100 microns. The solid filaments can have any desired cross-sectional shapes, such as a circle, oval, rectangle or other polygons. If the process is to include melting the filament in the ejector nozzles 108, the cross-sectional shape of the solid filaments can be the same as that of the cross-sectional shapes of the ejector nozzles 108 (e.g., with smaller dimensions to allow feeding of filaments through the nozzle).

The print material 104 is ejected from the ejector nozzles 108 as a liquid in the form of droplets. The droplets can optionally have a relatively small droplet size, which can allow for printing of fine details. As examples, droplet diameters can range from about 0.001 mm to about 0.2 mm, about 0.005 mm to about 0.1 mm, about 0.01 mm to about 0.05 mm. Droplets with larger diameters can also potentially be formed if desired, such as droplets of about 0.5 mm, about 1 mm, about 2 mm or larger. In an embodiment, the droplet diameters are less than 100 microns (0.1 mm), such as 90 microns, 80 microns, or 70 microns or less.

The method of the present disclosure can be employed to deposit print material 104 from any number of ejector conduits 106 simultaneously or separately as desired. The method can also allow for the deposition of small amounts of material from any one ejector nozzle 108 while still providing for a relatively high overall deposition rate due to the potentially large number of ejector conduits 106 in the array and the potentially high rate of ejection from each ejector conduit 106.

Figure 20:
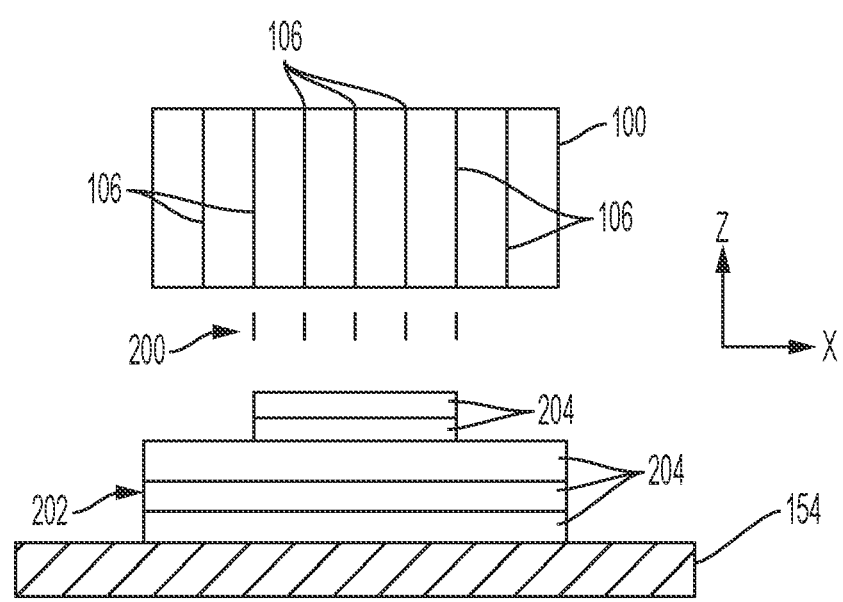
FIG. 20 illustrates a schematic side view of a printer jetting mechanism comprising a plurality of ejector conduits simultaneously ejecting droplets to print a 3D object on a print substrate, according to an embodiment of the present disclosure.

The printer jetting mechanisms for jetting print material described herein can be employed in various printing methods. For example, any of the printer jetting mechanisms described herein can be employed in a method of three-dimensional printing in which print material 104 (FIG. 1) is ejected from the ejector nozzles 108 and deposited onto a print substrate 154 (FIGS. 19 and 20), such as a build plate. One or both of the print substrate 154 and the array 107 of ejector nozzles 108 can move relative to each other in three dimensions during printing (e.g., in directions along an x-axis, y-axis and z-axis) in any suitable manner, thereby forming a 3D object. As is well known in the art, 3D printing comprises printing multiple droplets or layers of material, where each droplet or layer can be stacked one on the other, until a desired thickness of the 3D object is realized. FIG. 20 illustrates an example of a printer jetting mechanism 100 comprising a plurality of ejector conduits 106 simultaneously ejecting droplets 200 to print a 3D object 202 on a print substrate 154. Many layers 204 of droplets 200 may be deposited, one layer or droplet on the next, until the 3D object 202 is completed. As would be readily understood by one of ordinary skill in the art, the droplets and/or layers can be stacked in any desired order, so that, for example, a first underlying layer 204 may or may not be completed before beginning subsequent layers and there may or may not be a recognizable layering pattern to the order of material deposition. Rather, the droplets, layers and/or portions of layers can be stacked in any desired order to complete the 3D object.

The following examples are illustrative only and are not meant to, nor do they, limit the scope of the invention as set forth in the claims.

PROPHETIC EXAMPLES

Example 1: Molten Metal Ejection Using Lorentz Force: An Aluminum wire having a diameter of 0.0001 meters is fed into a refractory tube (e.g. fused silica). The refractory tube includes two electrodes positioned at the end thereof. The electrodes are connected to a current source and positioned in the tube to flow current through the wire material proximate the end of the tube. A permanent magnet that is cooled to within its operating temperatures is positioned proximate the ends of the refractory tubes to provide a magnetic flux region 133 near the ends of the tubes. The strength of the magnetic field provided by the magnet at the flux region 133 is about 0.8 Tesla. For the wire material, at least a portion of the wire is melted and maintained as a liquid proximate the end of the silica tube, so that the meniscus of the liquid is positioned at the end of the silica tube. Using the current source, a single current pulse is flowed through a 0.0001 meter end portion of the silica tube within the magnetic flux region 133, thereby applying a Lorentz force to the liquid aluminum. The free meniscus of the molten material accelerates axially in the tube. The acceleration of the molten aluminum in the tube, as shown in Table 1, corresponds to an energy above the energy it takes to detach a droplet of the molten material from the liquid and eject it from the tube, thus resulting in a droplet of molten material being jetted from the tube.

TABLE 1

Calculations For Molten Al Ejection Using Lorentz Force

|  | Units |  | Al Wire |  |
|---|---|---|---|---|
| Wire Properties |  |  |  |  |
| $T_{melt}$ | C. |  | 660 |  |
| Density | kg/m³ |  | 2700 | $\rho_m$ |
| Specific heat of melt | kJ/kg-K |  | 1.18 |  |
|  | J/kg-K |  | 1180 | c |
| Thermal expansivity of melt | 1/K |  | 1.34E-04 | β |
| Diameter | m | 0.0001 |  | d |
| Length | m | 0.0001 |  | l |
| Mass | kg |  | 2.12E-09 | m = ρπd²l/4 |

TABLE 1-continued

Calculations For Molten Al Ejection Using Lorentz Force

| | Units | | Al Wire | |
|---|---|---|---|---|
| Molten Process Properties | | | | |
| Magnetic flux density | T | | 0.8 | |
| Pulse length | s | 5.00E−06 | | $t_p$ |
| Velocity meniscus | m/s | | 0.80 | $v = \Delta l/t_p$ |
| Acceleration meniscus | m/s² | | 1.61E+05 | $a = \Delta l/t_p^2$ |
| Average acceleration | m/s² | | 8.04E+04 | $a_m = 0.5a$ |
| Motive force | N | | 1.70E−04 | $F = ma_m$ |
| Current | A | | 2.1 | $I = F/(d \cdot B)$ |
| Resistivity of melt | ohm-m | | 2.8E−07 | $\rho_e$ |
| Resistance | ohm | | 3.57E−03 | $R = 4\rho_e/\pi l$ |
| Ohmic current | A | | 2.1 | $I = F/dB$ |
| Voltage | V | | 0.27 | $V = IR$ |
| Tungsten resistivity 20 C. | ohm-m | 5.60E−08 | | |
| Lead length | m | 5.00E−03 | | |
| $R_W$ | ohm | 2.80E−02 | | |
| Series R contacts | ohm | | 6.0E−02 | |
| Voltage across contacts | V | | 0.13 | |
| Capacitance | F | | 8.39E−05 | |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A three-dimensional ("3D") printer, comprising:
    a plurality of ejector conduits arranged in an array, each ejector conduit comprising a first end positioned to accept a print material, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway;
    a current pulse generating system in electrical contact with the ejector nozzle of each of the plurality of ejector conduits;
    a magnetic field source sufficiently proximate the second end of the ejector conduit so as to generate a flux region disposed within the ejector nozzle during operation of the 3D printer; and
    a positioning system for controlling the relative position of the array with respect to a print substrate in a manner that would allow the print substrate to receive print material jettable from the ejector nozzle of each of the plurality of ejector conduits during operation of the 3D printer; and
    wherein at least one surface of the first electrode or at least one surface of the second electrode comprises a passivation coating, and is in contact with the print material at an exit of the ejector nozzle.

2. The three-dimensional printer of claim 1, further comprising a feeder mechanism for advancing an electrically conductive print material.

3. The three-dimensional printer of claim 1, further comprising a heating mechanism for melting a solid print material into a liquid print material and a reservoir for holding the liquid print material, the reservoir being in fluid connection with the plurality of ejector conduits.

4. The three-dimensional printer of claim 1, wherein the magnetic field source is a flux circuit comprising a magnet and a flux guide attached to the magnet, the flux guide being positioned proximate the ejector nozzle for each of the plurality of ejector conduits.

5. The three-dimensional printer of claim 1, wherein the magnetic field source comprises a permanent magnet.

6. The three-dimensional printer of claim 5, further comprising a cooling system for cooling the magnetic field source.

7. The three-dimensional printer of claim 1, wherein the current pulse generating system comprises a power supply, at least one current switch and at least one pulse control device arranged in a circuit, the pulse control device configured to provide variable control of one or more characteristics chosen from current amplitude and pulse length.

8. The three-dimensional printer of claim 1, wherein the ejector nozzle further comprising a third electrode and a fourth electrode.

9. The three-dimensional printer of claim 1, further comprising an electrically insulating material disposed laterally between the first electrode and the second electrode, wherein the electrically insulating material between the first electrode and the second electrode is a first electrically insulating material and at least a portion of each of the plurality of ejector conduits above the ejector nozzle comprise a second electrically insulating material, the first electrically insulating material being the same as, or different than, the second electrically insulating material.

10. The three-dimensional printer of claim 9, wherein the first electrically insulating material and the second electrically insulating material are both refractory materials that are independently chosen from metal oxides, ceramics and combinations thereof.

11. The three-dimensional printer of claim 1, wherein the plurality of ejector conduits are supported within an ejector housing.

12. The three-dimensional printer of claim 11, further comprising a heater mechanism for heating at least a portion of the ejector housing surrounding the ejector conduits during operation of the 3D printer, the heater mechanism being separate from the current pulse generating system.

13. The three-dimensional printer of claim 1, wherein the ejector nozzle has an inner width ranging from about 10 microns to about 1000 microns.

14. The three-dimensional printer of claim 1, wherein the ejector nozzle has an inner width ranging from about 10 microns to about 200 microns.

15. The three-dimensional printer of claim 1, wherein the array has M columns of ejector conduits arranged on an X axis and N rows of ejector conduits arranged on a Y axis, where M is an integer ranging from 2 to 1000 and N is an integer ranging from 1 to 2.

16. The three-dimensional printer of claim 15, where M is an integer ranging from 5 to 1000.

17. A printer jetting mechanism, comprising:
a plurality of ejector conduits arranged in an array, each ejector conduit comprising a first end positioned to accept a print material, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway;
a current pulse generating system in electrical contact with the ejector nozzle of each of the plurality of ejector conduits; and
a magnetic field source sufficiently proximate the second end of the ejector conduit so as to generate a flux region disposed within the ejector nozzle during operation of the printer; and
wherein at least one surface of the first electrode or at least one surface of the second electrode comprises a passivation coating, and is in contact with the print material at an exit of the ejector nozzle.

18. The printer jetting mechanism of claim 17, wherein the magnetic field source is a flux circuit comprising a magnet and a flux guide attached to the magnet, the flux guide being positioned proximate the ejector nozzle for each of the plurality of ejector conduits.

19. The printer jetting mechanism of claim 17, wherein the magnetic field source comprises a permanent magnet.

20. The printer jetting mechanism of claim 17, further comprising a cooling system for cooling the magnetic field source.

21. A three-dimensional ("3D") printer jetting mechanism, comprising:
a plurality of ejector conduits arranged in an array, each ejector conduit comprising a first end positioned to accept a print material, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway; and
wherein at least one surface of the first electrode or at least one surface of the second electrode comprises a passivation coating, and is in contact with the print material at an exit of the ejector nozzle.

* * * * *